United States Patent
Yamaji et al.

(10) Patent No.: US 10,410,677 B2
(45) Date of Patent: Sep. 10, 2019

(54) CONTENT MANAGEMENT SYSTEM, MANAGEMENT CONTENT GENERATING METHOD, MANAGEMENT CONTENT PLAY BACK METHOD, AND RECORDING MEDIUM

(71) Applicant: FUJIFILM Corporation, Tokyo (JP)

(72) Inventors: Kei Yamaji, Tokyo (JP); Tetsuya Matsumoto, Tokyo (JP); Keiichi Yoshihara, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 228 days.

(21) Appl. No.: 14/837,721

(22) Filed: Aug. 27, 2015

(65) Prior Publication Data

US 2016/0078904 A1 Mar. 17, 2016

(30) Foreign Application Priority Data

Sep. 12, 2014 (JP) .................. 2014-186242

(51) Int. Cl.
  *G06K 9/00* (2006.01)
  *G11B 27/19* (2006.01)
  (Continued)

(52) U.S. Cl.
  CPC .......... *G11B 27/19* (2013.01); *G06K 9/00362* (2013.01); *G06K 9/46* (2013.01);
  (Continued)

(58) Field of Classification Search
  None
  See application file for complete search history.

(56) References Cited

U.S. PATENT DOCUMENTS 5,576,950 A 11/1996 Tonomura
6,101,292 A 8/2000 Udagawa et al.
(Continued)

FOREIGN PATENT DOCUMENTS

CN 101640746 2/2010
JP H0795505 A 4/1995
(Continued)

OTHER PUBLICATIONS

Extended European Search Report; dated Feb. 8, 2016; Appln. No. 15182560.1-1903.

(Continued)

*Primary Examiner* — Sean M Conner
(74) *Attorney, Agent, or Firm* — Young & Thompson

(57) ABSTRACT

In a content management system, the still image extracting unit extracts a plurality of frames of still image data from the moving image data based on the motion of the person of interest. The scene determining unit determines a scene of the moving image including a still image corresponding to each of the plurality of frames of the still image data. The management marker registration unit registers, as a management marker, each of the plurality of frames of still image data or an image feature amount of each still image in association with a scene of a moving image corresponding to each still image. The management image generator generates management image data including at least two pieces of the still image data.

7 Claims, 18 Drawing Sheets

(51) Int. Cl.
*G11B 27/11* (2006.01)
*G06K 9/46* (2006.01)
*G06T 7/20* (2017.01)
*G06T 19/00* (2011.01)
*G11B 27/00* (2006.01)
*G11B 27/034* (2006.01)
*G11B 27/36* (2006.01)
*H04N 5/765* (2006.01)

(52) U.S. Cl.
CPC ............. *G06T 7/20* (2013.01); *G06T 19/006* (2013.01); *G11B 27/005* (2013.01); *G11B 27/034* (2013.01); *G11B 27/11* (2013.01); *G11B 27/36* (2013.01); *H04N 5/765* (2013.01); *G06T 2207/10004* (2013.01); *G06T 2207/10016* (2013.01); *G06T 2207/10024* (2013.01); *G06T 2207/30204* (2013.01)

(56) References Cited

U.S. PATENT DOCUMENTS

| | | | |
|---|---|---|---|
| 8,270,806 B2 | 9/2012 | Yashiro | |
| 8,289,410 B2 | 10/2012 | Yamaguchi | |
| 2004/0181747 A1 | 9/2004 | Hull | |
| 2006/0034518 A1 | 2/2006 | McDonnell et al. | |
| 2007/0101268 A1* | 5/2007 | Hua | G06F 17/30825 715/721 |
| 2008/0313570 A1* | 12/2008 | Shamma | G11B 27/034 715/846 |
| 2009/0212923 A1* | 8/2009 | Tokashiki | H04N 5/765 340/10.42 |
| 2010/0104266 A1* | 4/2010 | Yashiro | G06K 9/00295 386/201 |
| 2011/0255748 A1* | 10/2011 | Komoto | G06K 9/00335 382/103 |
| 2015/0131851 A1* | 5/2015 | Bernal | G06K 9/00711 382/103 |
| 2017/0200314 A1* | 7/2017 | Jeong | G06T 19/006 |

FOREIGN PATENT DOCUMENTS

| | | |
|---|---|---|
| JP | 09-22469 | 1/1997 |
| JP | 2005072964 A | 3/2005 |
| JP | 2005202477 A | 7/2005 |
| JP | 2006-127476 | 5/2006 |
| JP | 2007-189324 | 7/2007 |
| JP | 2010109592 A | 5/2010 |
| JP | 2013183255 A | 9/2013 |

OTHER PUBLICATIONS

Japanese Office Action dated Sep. 27, 2016; Application No. 2014-186242.
Chinese Office Action for Application No. 201510542491.7, dated Aug. 27, 2018, with partial English translation provided.
European Office Action for Application No. 15 182 560.1, dated Feb. 8, 2019.

* cited by examiner

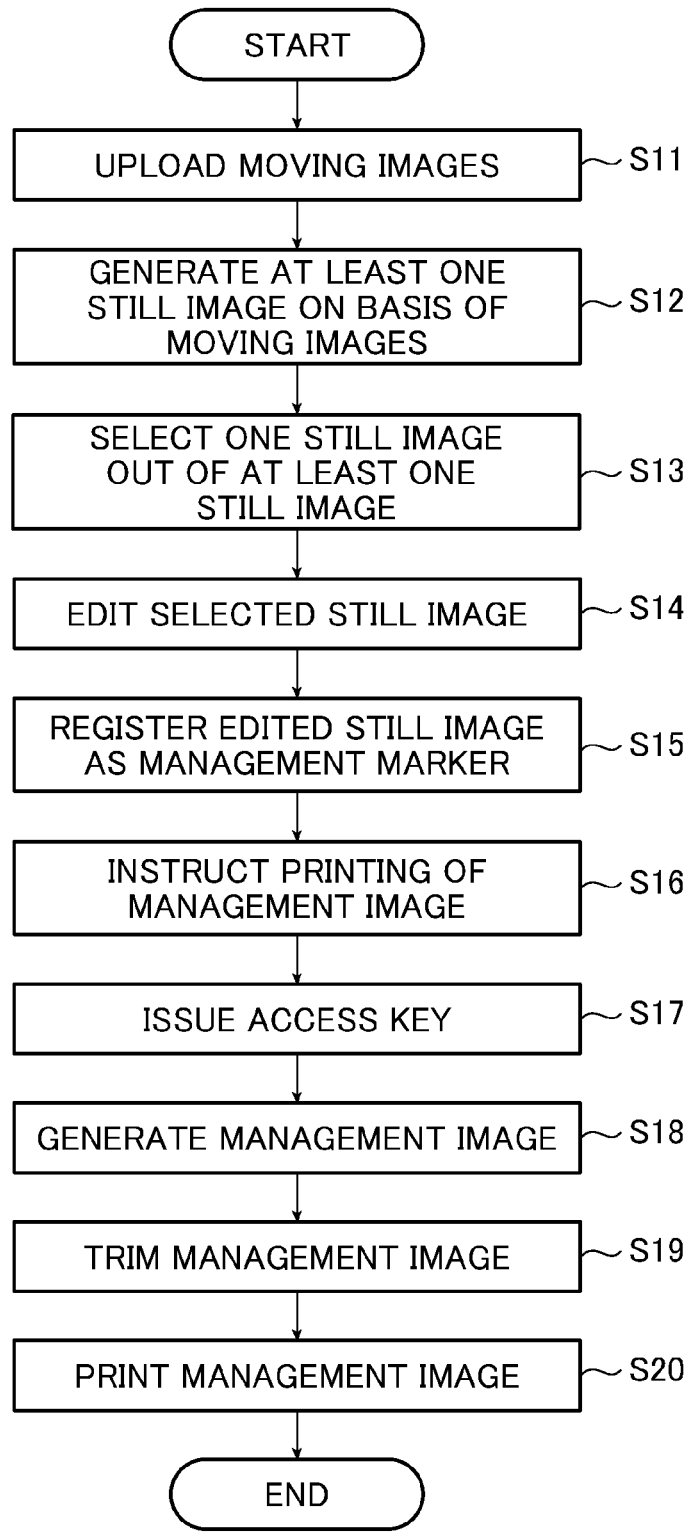

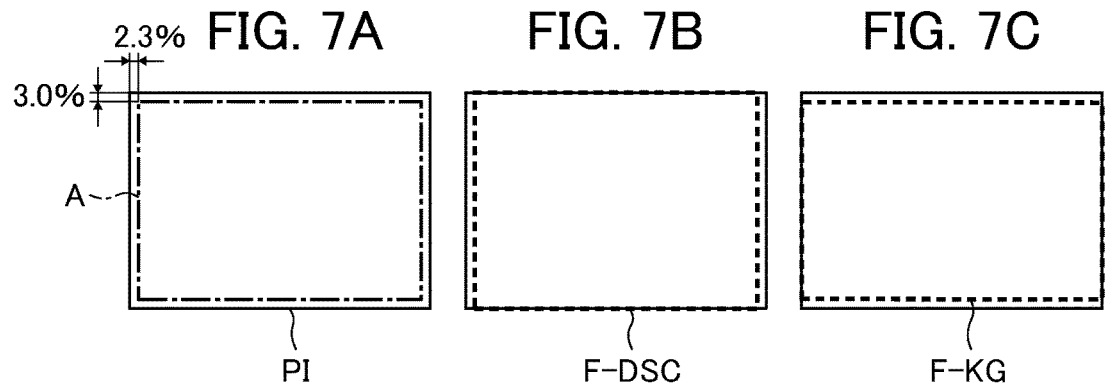
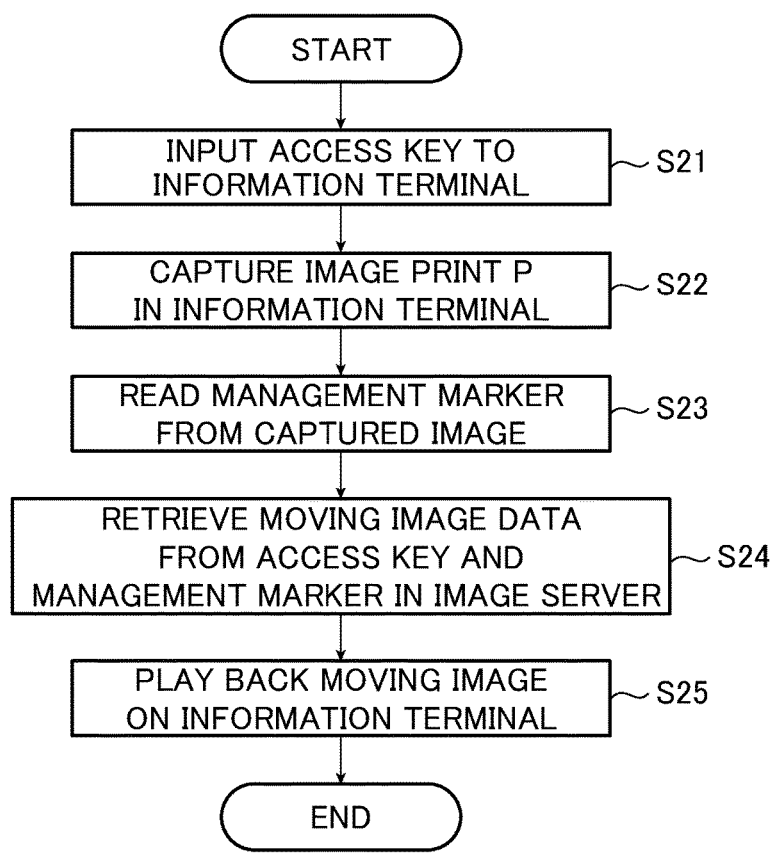

FIG. 9
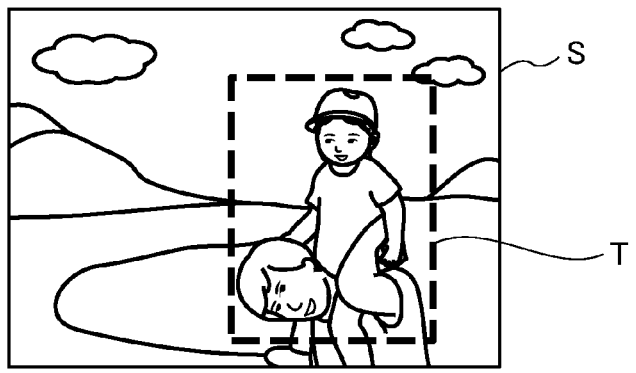
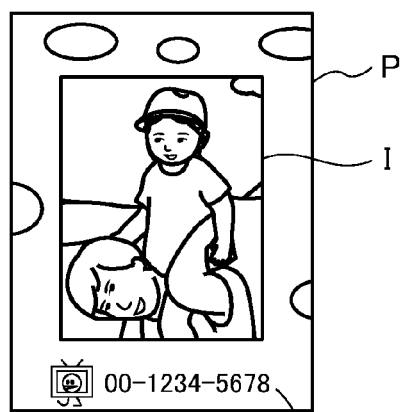
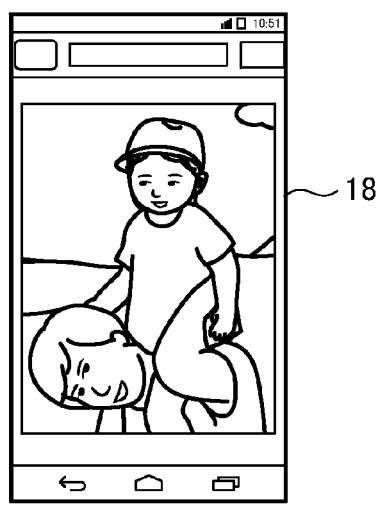

FIG. 22
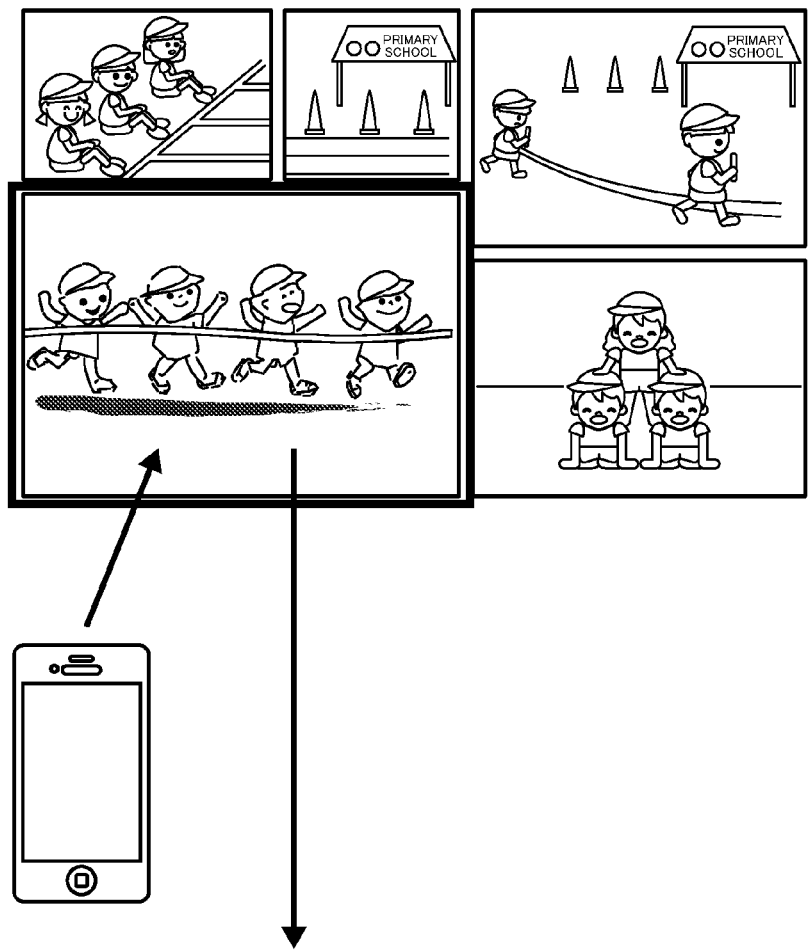
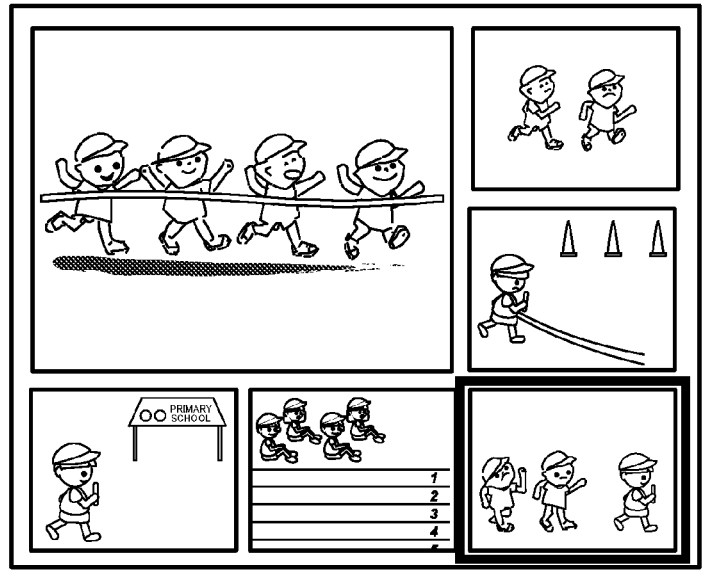

CONTENT MANAGEMENT SYSTEM, MANAGEMENT CONTENT GENERATING METHOD, MANAGEMENT CONTENT PLAY BACK METHOD, AND RECORDING MEDIUM

CROSS-REFERENCE TO RELATED APPLICATIONS

The present application claims priority under 35 U.S.C. § 119 to Japanese Patent Application No. 2014-186242, filed on Sep. 12, 2014. The above application is hereby expressly incorporated by reference, in its entirety, into the present application.

BACKGROUND OF THE INVENTION

The invention relates to a content management system for managing content such as still images and moving images, a management content generating method, a management content play back method, and a recording medium.

Conventionally, systems are known which, by capturing (imaging) printed matter or the like having predetermined markers using an information terminal such as a smart phone, display the captured printed matter or the like on a monitor of the information terminal and which use Augmented Reality (AR) techniques for playing back content, such as predetermined videos or music, in the display portion of the printed matter or the like displayed on the monitor of the information terminal.

In addition, Patent Document 1 (JP 2006-127476) discloses a method for managing a library of images, an index print having a plurality of images and memory tags corresponding to the images, and a read and write device which reads information from the memory tags and writes information to the memory tags.

Patent Document 2 (JP 2007-189324) discloses a still image extraction system for extracting still image data from among moving image data and Patent Document 3 (JP H9-22469) discloses an image processing device generating reference image data, which is a small amount of data, from moving image data.

SUMMARY OF THE INVENTION

Systems using the AR techniques described above focus on uses for the advertising of promotional materials or the like and attempts at creating content (AR content) using AR techniques for general users have not achieved much popularity.

In addition, although it might be possible to generate AR content combining still images and moving images, for example, by using the index print and the read and write device disclosed in Patent Document 1, the still image extraction system disclosed in Patent Document 2, or the image processing device disclosed in Patent Document 3, the generation of AR content requires a complicated series of processes such as extracting still image data from moving image data, generating markers, associating the still image data and the moving image data, and the like. This series of processes in the generation of AR content is an obstacle to the use of AR techniques by general users.

An object of the invention is to provide a content management system, a management content generating method, a management content play back method, and a recording medium, which are able to generate, play back, and manage content using AR techniques in a simple manner and in a short time without a user having to perform a complicated series of processes such as explicitly creating markers for management, explicitly registering content corresponding to the markers for management, and the like.

In order to attain the object described above, the present invention provides a content management system that manages management content having a management image and moving image data associated with the management image, comprising:

a still image data extracting unit that extracts a plurality of frames of still image data from moving image data;

a person of interest detecting unit that detects a person of interest that is a person who is a processing target from each of a plurality of still images corresponding to the plurality of frames of still image data;

a movement trajectory detecting unit that detects a movement trajectory of the person of interest by tracking movement of the person of interest in a moving image corresponding to the moving image data based on detection results of the person of interest in the plurality of still images;

a motion analysis unit that analyzes a motion of the person of interest in the moving image based on the movement trajectory of the person of interest and calculates an evaluation value with respect to the motion of the person of interest based on the analyzed motion of the person of interest for each of the plurality of still images;

a still image data output unit that outputs, from among the plurality of frames of still image data, still image data of one still image having the evaluation value with respect to the motion of the person of interest equal to or greater than a threshold value as output still image data;

a management marker registration unit that registers, as a management marker, the output still image data or an image feature amount of an output still image corresponding to the output still image data in association with moving image data of a moving image corresponding to the output still image; and a management image generator that generates management image data including the output still image data.

Also, the present invention provides a content management system that manages management content having a management image and moving image data associated with the management image, comprising:

a still image data extracting unit that extracts a plurality of frames of still image data from moving image data;

a person of interest detecting unit that detects a person of interest that is a person who is a processing target from each of a plurality of still images corresponding to the plurality of frames of still image data;

a movement trajectory detecting unit that detects a movement trajectory of the person of interest by tracking movement of the person of interest in a moving image corresponding to the moving image data based on detection results of the person of interest in the plurality of still images;

a motion analysis unit that analyzes a motion of the person of interest in the moving image based on the movement trajectory of the person of interest and calculates an evaluation value with respect to the motion of the person of interest based on the analyzed motion of the person of interest for each of the plurality of still images;

a still image data output unit that outputs, from among the plurality of frames of still image data, still image data of two or more still images each having the evaluation value with respect to the motion of the person of interest equal to or greater than a threshold value as output still image data;

a scene determining unit that determines a scene of the moving image including an output still image corresponding to the output still image data for each of two or more pieces of the output still image data;

a management marker registration unit that registers, as a management marker, each of the two or more pieces of output still image data or an image feature amount of each of two or more output still images corresponding to the two or more pieces of output still image data in association with moving image data of a scene of a moving image corresponding to each of the two or more output still images; and a management image generator that generates management image data including at least two pieces of the output still image data.

Also, the present invention provides a method for generating management content having a management image and moving image data associated with the management image, comprising the steps of:

extracting a plurality of frames of still image data from moving image data with a still image data extracting unit;

detecting a person of interest that is a person who is a processing target from among each of a plurality of still images corresponding to the plurality of frames of still image data with a person of interest detecting unit;

detecting a movement trajectory of the person of interest by tracking movement of the person of interest in a moving image corresponding to the moving image data based on detection results of the person of interest in the plurality of still images with a movement trajectory detecting unit;

analyzing a motion of the person of interest in the moving image based on the movement trajectory of the person of interest and calculating an evaluation value with respect to the motion of the person of interest based on the analyzed motion of the person of interest for each of the plurality of still images with a motion analysis unit;

outputting, from among the plurality of frames of still image data, still image data of one still image having the evaluation value with respect to the motion of the person of interest equal to or greater than a threshold value as output still image data with a still image data output unit;

registering, as a management marker, the output still image data or an image feature amount of an output still image corresponding to the output still image data in association with moving image data of a moving image corresponding to the output still image with a management marker registration unit; and generating management image data including the output still image data with a management image generator.

Also, the present invention provides a management content play back method for playing back management content generated by the method for generating management content according to above, comprising the steps of:

generating captured image data by capturing a management image print corresponding to the management image data with an imaging unit;

reading the management marker from a captured image corresponding to the captured image data with a management marker reading unit;

carrying out control with a display controller when an output still image included in the management image print is captured by the imaging unit, so as to play back, on the monitor, a moving image corresponding to moving image data associated with a management marker read by the management marker reading unit from the captured output still image.

Also, the present invention provides a method for generating management content having a management image and moving image data associated with the management image, comprising the steps of:

extracting a plurality of frames of still image data from moving image data with a still image data extracting unit;

detecting a person of interest that is a person who is a processing target from each of a plurality of still images corresponding to the plurality of frames of still image data with a person of interest detecting unit;

detecting a movement trajectory of the person of interest by tracking movement of the person of interest in a moving image corresponding to the moving image data based on detection results of the person of interest in the plurality of still images with a movement trajectory detecting unit;

analyzing a motion of the person of interest in the moving image based on the movement trajectory of the person of interest and calculating an evaluation value with respect to the motion of the person of interest based on the analyzed motion of the person of interest for each of the plurality of still images with a motion analysis unit;

outputting, from among the plurality of frames of still image data, still image data of two or more still images each having the evaluation value with respect to the motion of the person of interest equal to or greater than a threshold value as output still image data with a still image data output unit;

determining a scene of the moving image including an output still image corresponding to the output still image data for each of two or more pieces of the output still image data with a scene determining unit;

registering, as a management marker, each of the two or more pieces of output still image data or an image feature amount of each of two or more output still images corresponding to the two or more pieces of output still image data in association with moving image data of a scene of a moving image corresponding to each of the two or more output still images with a management marker registration unit; and generating management image data including at least two pieces of the output still image data with a management image generator.

Also, the present invention provides a management content play back method for playing back management content generated by the management content generating method according to above, comprising the steps of:

generating captured image data by capturing a management image print corresponding to the management image data with an imaging unit;

reading the management marker from a captured image corresponding to the captured image data with a management marker reading unit;

carrying out control with a display controller when one output still image from among output still images included in the management image print is captured by the imaging unit, so as to play back, on the monitor, a scene of a moving image corresponding to moving image data associated with a management marker read by the management marker reading unit from the one output still image captured.

Also, the present invention provides a method for generating management content having a management image and moving image data associated with the management image, comprising the steps of:

extracting a plurality of frames of still image data from moving image data with a still image data extracting unit;

detecting a person of interest that is a person who is a processing target from each of a plurality of still images corresponding to the plurality of frames of still image data with a person of interest detecting unit;

detecting a movement trajectory of the person of interest by tracking movement of the person of interest in a moving image corresponding to the moving image data based on detection results of the person of interest in the plurality of still images with a movement trajectory detecting unit;

analyzing a motion of the person of interest in the moving images based on the movement trajectory of the person of interest and calculating an evaluation value with respect to the motion of the person of interest based on the analyzed motion of the person of interest for each of the plurality of still images with a motion analysis unit;

outputting, from among the plurality of frames of still image data, still image data of one or two or more still images each having the evaluation value with respect to the motion of the person of interest equal to or greater than a threshold value as output still image data with a still image data output unit;

determining a scene of the moving image including an output still image corresponding to the output still image data for one piece of the output still image data or each of two or more pieces of the output still image data with a scene determining unit;

repeatedly performing processes on each of a plurality of pieces of moving image data with the still image data extracting unit, the person of interest detecting unit, the movement trajectory detecting unit, the motion analysis unit, the still image data output unit, and the scene determining unit;

registering, as a first management marker, each of a plurality of pieces of first output still image data obtained by selecting at least one piece of the output still image data from among each of the output still image data corresponding to each of the plurality of pieces of moving image data, or an image feature amount of each of a plurality of first output still images corresponding to the plurality of pieces of first output still image data, in association with moving image data of a scene of a moving image corresponding to each of the plurality of first output still images, and, by setting the output still image data as second output still image data for each of the plurality of pieces of moving image data, registering, as a second management marker, one piece of the second output still image data or each of two or more pieces of the second output still image data, or an image feature amount of a second output still image corresponding to the one piece of second output still image data or each of the two or more pieces of second output still image data, in association with moving image data of a scene of a moving image corresponding to one piece of the second output still image or each of two or more pieces of the second output still images with a management marker registration unit; and generating first management image data including at least two pieces of the first output still image data and second management image data including at least one piece of the second output still image data for each of the plurality of pieces of moving image data with the management image generator.

Also, the present invention provides a management content play back method for playing back management content generated by the management content generating method according to above, comprising the steps of:

generating captured image data by capturing a print of a first management image corresponding to the first management image data with an imaging unit;

reading the first management marker from the captured image corresponding to the captured image data with a management marker reading unit;

carrying out control with a display controller when one first output still image is captured by the imaging unit from among first output still images included in the print of the first management image, so that a second management image corresponding to the moving image data associated with the first management marker read by the management marker reading unit from the one first output still image captured is displayed on the monitor;

inputting an instruction via an operation input unit to select one second output still image from among second output still images included in the second management image displayed on a monitor; and carrying out control with the display controller when one second output still image is selected from among second output still images included in the second management images displayed on the monitor according to an instruction inputted via the operation input unit, so that a scene of a moving image corresponding to moving image data associated with a second management marker read by the management marker reading unit from the one second output still image selected is played back on the monitor.

Also, the present invention provides a non-transitory computer-readable recording medium recording a program for causing a computer to execute each step of the method for generating management content according to above.

Also, the present invention provides a non-transitory computer-readable recording medium recording a program for causing a computer to execute each step of the management content play back method according to above.

The invention makes it possible to generate content using AR techniques in a simple manner and in a short time without the user performing complicated processes, and makes it possible to play back content using AR techniques in a simple manner. In addition, the invention makes it possible to greatly reduce the work of the user in the content management.

In addition, because the invention makes it possible to associate each output still image included in a management image print with corresponding scenes in each moving image, the output still images included in the management image print can be used as an index of the corresponding scenes of each of the moving images, and the desired scenes of moving images can be played back by capturing a desired output still image included in the management image print.

In addition, because the invention makes it possible to gather a plurality of moving images in one print of first management images, the user can instantly grasp a digest of the content of a plurality of moving images by viewing the print of the first management images.

BRIEF DESCRIPTION OF THE DRAWINGS

FIG. 5 is a flow chart illustrating a method for generating the management print P of FIG. 4.

FIGS. 7A to 7C are explanatory diagrams for illustrating automatic trimming when generating the management print P.

FIG. 8 is a flow chart for playing back a corresponding moving image based on the management print P.

FIG. 9 is an explanatory diagram for illustrating a relationship between the management print P which has still images trimmed by a user and moving images to be played back.

FIG. 22 is a conceptual diagram which represents a state in which one first output still image is captured from among first output still images included in a print of the first management images and then one second output still image is selected from among second output still images included in second management images displayed on a monitor.

DETAILED DESCRIPTION OF THE INVENTION

Detailed description will be given below of the content management system, the management content generating method, the management content play back method, and the recording medium according to the invention based on favorable embodiments illustrated in the attached drawings.

Figure 1:
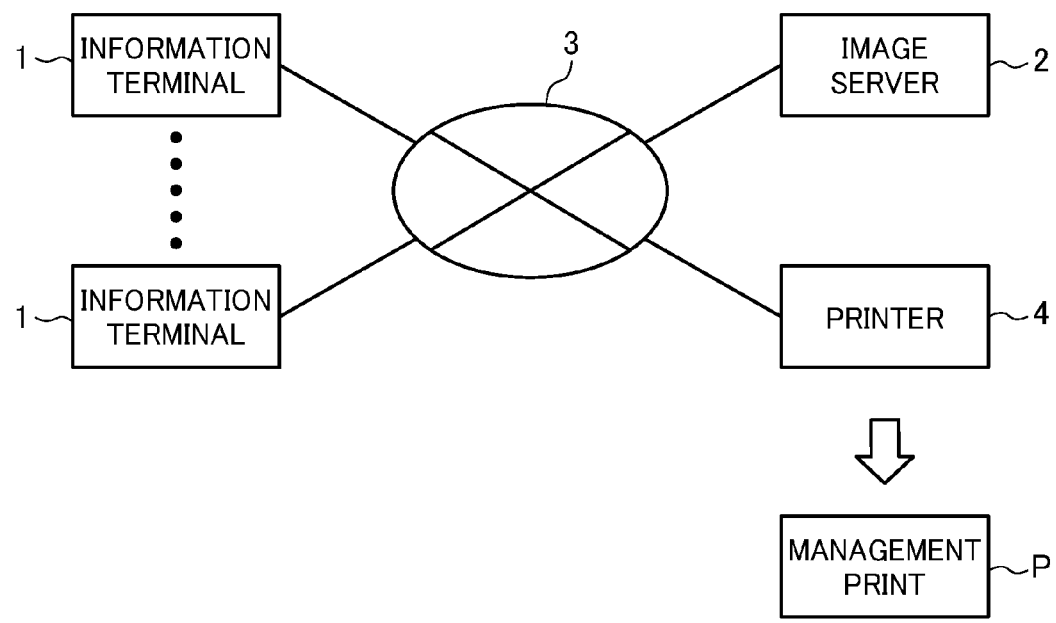
FIG. 1 is a schematic diagram illustrating an overall configuration of a content management system according to one embodiment of the invention.
Figure 2:
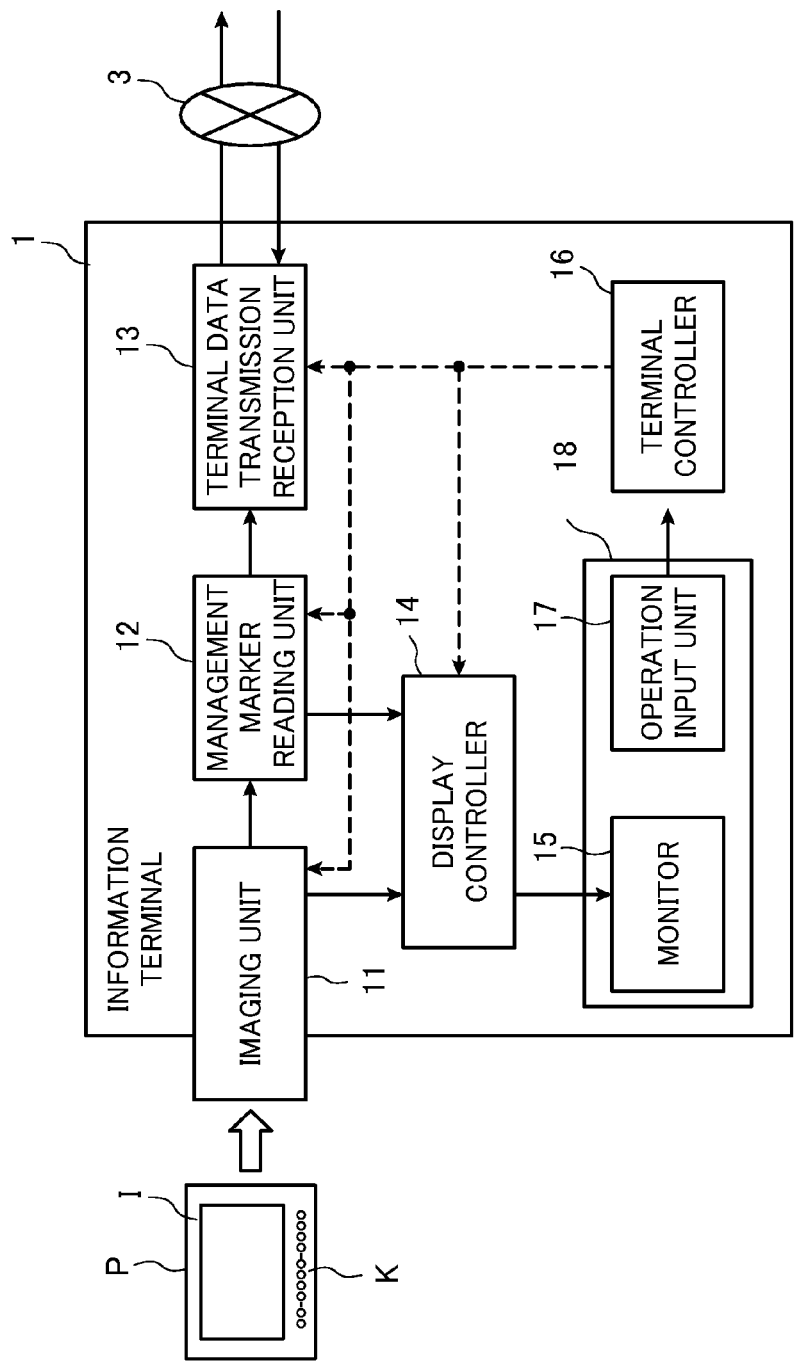
FIG. 2 is a block diagram illustrating a detailed configuration of an information terminal 1 in the content management system of FIG. 1.
Figure 3:
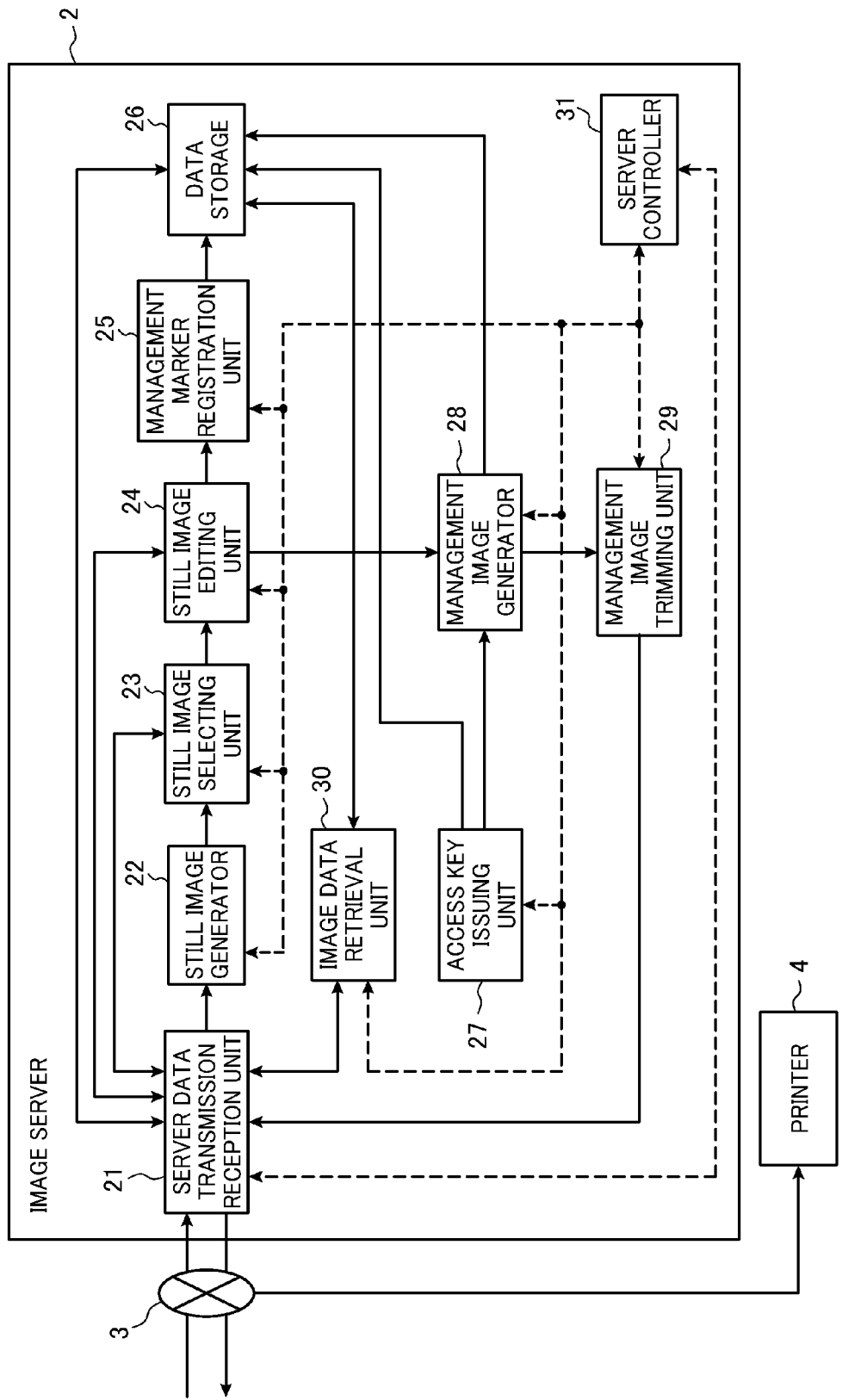
FIG. 3 is a block diagram illustrating a detailed configuration of an image server 2 in the content management system of FIG. 1.
Figure 4:
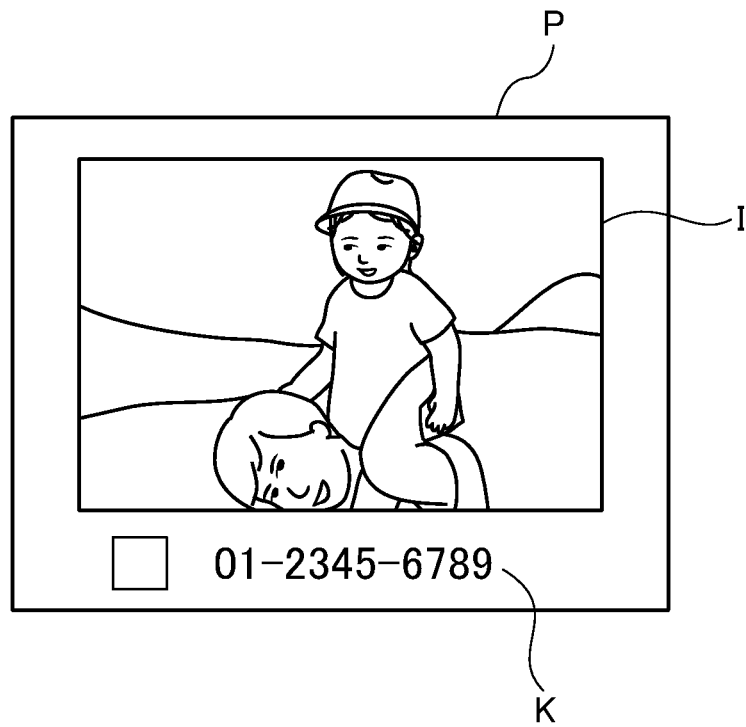
FIG. 4 is a diagram illustrating an example of a management print P.

FIG. 1 is a schematic diagram illustrating an overall configuration of a content management system according to one embodiment of the invention. FIG. 2 is an explanatory diagram illustrating a detailed configuration of the information terminal 1 illustrated in FIG. 1. FIG. 3 is an explanatory diagram illustrating a detailed configuration of the image server 2 illustrated in FIG. 1. FIG. 4 is an explanatory diagram illustrating a detailed configuration of a content management print P (hereinafter, referred to as a management print) illustrated in FIG. 1.

The content management system according to an embodiment of the invention manages management content having management images and moving image data associated with the management images. As illustrated in FIG. 1, the content management system is provided with at least one information terminal 1, an image server 2, a communication line 3 connecting the information terminal 1 and the image server 2 to each other, a printer 4 connected with the communication line 3, and the management print P output by the printer 4.

The information terminal 1 is, for example, a smart phone, a tablet PC, a notebook PC, or the like, and is connected with the communication line 3 by wired or wireless connections.

In addition, the image server 2 is, for example, a network server connected with the communication line 3 and is configured to perform various types of data processes based on instructions from the information terminal 1.

The communication line 3 is, for example, an internet line connecting between the information terminal 1 and the image server 2 and is configured to enable bidirectional communication therebetween.

In addition, the printer 4 is, for example, a network printer connected with the communication line 3, and is configured to acquire image data from the image server 2 based on output instructions from the information terminal 1 or the like and print the management print P based on the output instructions and the image data. Instead of the printer 4, a display device which displays images on a screen based on the image data may be connected with the communication line 3 and the printer 4 and the display device may each be connected with the communication line 3.

In the management print P, content management images (hereinafter, referred to as management images) which have still images registered as content management markers (hereinafter, referred to as management markers) and an access key are printed on a predetermined medium as an image product. The image product is a photo book, a digital camera print, a post card, a collage, or the like, and may be free or paid.

FIG. 2 is a block diagram illustrating a detailed configuration of the information terminal 1 of the content management system illustrated in FIG. 1.

As illustrated in FIG. 2, the information terminal 1 has an imaging unit 11, and a management marker reading unit 12 and a terminal data transmission reception unit 13 connected in order from the imaging unit 11. In addition, the information terminal 1 has a display controller 14 connected with the imaging unit 11 and the management marker reading unit 12, and has a monitor 15 connected with the display controller 14. In addition, the information terminal 1 has a terminal controller 16 connected with each of the imaging unit 11, the management marker reading unit 12, the terminal data transmission reception unit 13, and the display controller 14, and an operation input unit 17 is connected with the terminal controller 16. In addition, the monitor 15 and the operation input unit 17 may be integrally formed as a touch panel 18 in the information terminal 1.

The imaging unit 11 is provided with an imaging optical system such as an optical lens (not illustrated in the diagram) and imaging elements such as a CCD sensor or a CMOS sensor (not illustrated in the diagram). The imaging unit 11 images and outputs the captured image data based on user instructions. The imaging unit 11 of the embodiment images (captures) a still image I of the management print P and outputs the captured image data including the still image I.

The management marker reading unit 12 detects the still image I from the captured images based on the captured image data, reads a management marker from the still image I based on a predetermined algorithm, and outputs the management marker. The management marker is a feature amount of the still image I read from the still image I using the predetermined algorithm and examples thereof include edge information or the like of the filming target illustrated in the still image I.

The terminal data transmission reception unit 13 is configured to transmit data to the image server 2, the printer 4, or the like via the communication line 3 and receive data from the image server 2, the printer 4, or the like via the communication line 3. Examples of the data to be transmitted and received include still image data and moving image data, user instructions inputted into the operation input unit 17 of the information terminal 1, responses from the information terminal 1 and the image server 2, and the like.

The display controller 14 is configured to control the monitor 15 based on instructions from the terminal controller 16 and displays the still images or the moving image or images used to input predetermined operations on the monitor 15.

In a case where the display controller 14 plays back moving images on the monitor 15, the play back (AR play back) may be carried out using AR techniques, or the play back (normal play back) may be carried out without using AR techniques. In the case of carrying out the AR play back on the moving images, the display controller 14 carries out control such that the captured (imaged) management print P is displayed on the monitor 15 and the moving images are played back in a display portion of the still image I of the management print P displayed on the monitor 15. In addition, in the case of carrying out normal play back on the moving images, the display controller 14 carries out control such that the moving image is played back over the entire surface of the monitor 15 or in a window with an optional size.

The monitor 15 is, for example, configured by a liquid crystal display, an organic electroluminescent (EL) display, or the like and displays still images based on the still image data, moving images based on the moving image data, or images or the like used to input predetermined operations according to instructions from the display controller 14.

The terminal controller 16 is configured to control each section of the information terminal 1 based on user instructions or a predetermined program or the like recorded in a memory (not illustrated in the diagram).

The operation input unit 17 is, for example, configured by buttons, a keyboard, a mouse, or the like and is configured to output user input to the terminal controller 16 as an input signal. The monitor 15 and the operation input unit 17 described above may be integrally configured by a touch panel, and the monitor 15 and the operation input unit 17 are configured by a touch panel 18 in the embodiment. In such a case, the operation input unit 17 is configured by operation images displayed on the liquid crystal display or the like and a touch sensor installed at the upper side of the monitor 15.

FIG. 3 is a block diagram illustrating a detailed configuration of the image server 2 of the content management system illustrated in FIG. 1.

As illustrated in FIG. 3, the image server 2 has a server data transmission reception unit 21, and a still image generator 22, a still image selecting unit 23, a still image editing unit 24, a management marker registration unit 25, and a data storage 26 connected in order with the server data transmission reception unit 21, the server data transmission reception unit 21 and the still image selecting unit 23 are connected with each other, and the server data transmission reception unit 21 is connected with the data storage 26. In addition, the image server 2 has an access key issuing unit 27 connected with the data storage 26, a management image generator 28 connected with the still image editing unit 24 and the access key issuing unit 27 and connected with the data storage 26, a management image trimming unit 29 connected with the management image generator 28 and connecting to the server data transmission reception unit, and an image data retrieval unit 30 connecting the server data transmission reception unit 21 and the data storage 26 to each other. In addition, the image server 2 has a server controller 31 connected with each of the server data transmission reception unit 21, the still image selecting unit 23, the still image editing unit 24, the management marker registration unit 25, the access key issuing unit 27, the management image generator 28, the management image trimming unit 29, and the image data retrieval unit 30.

The server data transmission reception unit 21 is configured to receive data from the information terminal 1 or the like via the communication line 3 and transmit data to the information terminal 1, the printer 4, or the like via the communication line 3. In the same manner as described above, examples of the data to be transmitted and received include still image data and moving image data, user instructions inputted into the operation input unit 17 of the information terminal 1, responses from the information terminal 1 and the image server 2, and the like.

The still image generator 22 is configured to generate at least one still image from the moving images based on the moving image data and output at least one frame of still image data. In the absence of any condition such as the moving image having an extremely short duration, typically, a plurality of still images is generated and a plurality of frames of still image data is output. The still images are generated in the still image generator 22 by, for example, analyzing still images which configure each frame of the moving images, detecting the color, brightness, blur, camera shaking, or the like, and extracting still images corresponding to frames before and after large changes in the color or brightness or unblurred still images or unshaken still images having had appropriate exposure. In addition, the size and orientation of the faces of the people in the moving images, and the facial expressions (smiling, crying, and the like) thereof may be detected and the still images may be extracted based thereon. Furthermore, in a case where sound is associated with the moving images, still images may be extracted from the moving image before or after a point of time (time code) at which the sound becomes louder. Extracting the still images from the moving images with the methods described above allows for extracting representative scenes of the moving images as still images.

The still image selecting unit 23 is configured to allow the user to select one frame of still image data from at least one frame of still image data generated by the still image generator 22, and, for example, the still image selecting unit 23 is configured to generate thumbnail image data for at least one frame of still image data and transmit the thumbnail image data from the server data transmission reception unit 21 to the information terminal 1, and the thumbnail image of at least one still image is displayed on the monitor 15 of the information terminal 1, and the user is able to make a selection. The information of the thumbnail image selected in the information terminal 1 is transmitted from the terminal data transmission reception unit 13 of the information terminal 1 via the server data transmission reception unit 21 of the image server 2 to the still image selecting unit 23. The still image selecting unit 23 selects one frame of still image data from at least one frame of still image data based on information relating to the selected thumbnail image and outputs the selected still image data as the selected still image data. Instead of the thumbnail image data, the still image data itself may be transmitted to the information terminal 1.

The still image editing unit 24 is configured to perform editing processes on the selected still image such as setting a background frame, image correction such as color correction, trimming, enlargement and reduction, and rotation on the basis of user instructions based on selected still image data output from the still image selecting unit 23. For example, the still image editing unit 24 is configured to transmit selected still image data to the information terminal 1 via the server data transmission reception unit 21, display the selected still image on the monitor 15 of the information terminal 1, and allow the user to input the editing process for the selected still image. Information relating to the editing process such as the background frame, image correction, trimming, enlargement and reduction, or rotation inputted into the operation input unit 17 by the user is transmitted to the still image editing unit 24 via the server data transmission reception unit 21 of the image server 2 from the terminal data transmission reception unit 13 of the information terminal 1. The still image editing unit 24 performs an editing process on the selected still image based on information relating to the inputted editing process and outputs the results as edited still image data. Instead of performing the editing process on the selected still image in the still image editing unit 24, the edited still image data may be generated by performing the editing process on the selected still image in the information terminal 1 and the edited still image data may be transmitted from the information terminal 1 to the image server 2. In addition, the still image editing process in the still image editing unit 24 is not essential and the acquired still image data may be output as is without performing any kind of editing process.

The management marker registration unit 25 is configured to register the edited still image as a management marker based on the edited still image data output from the still image editing unit 24. For example, the management marker registration unit 25 analyzes the edited still image based on a predetermined algorithm, calculates feature amounts such as information relating to the edges in the edited still image or position information of the edges, sets the feature amounts as management markers of the edited still image and registers the management markers in association with the corresponding moving image data. Registering the management markers in association with the moving image data allows for retrieving the moving image data stored in the data storage 26 by setting the management marker as a retrieval condition.

The data storage 26 is configured to store the still image data, the moving image data, information relating thereto, and the like. The data storage 26 is, for example, configured by a large-capacity recording medium such as an HDD or an SSD. The moving image data, the management image data, and the like are associated with the management markers and stored in the data storage 26.

The access key issuing unit 27 issues an access key upon receiving output instructions for the management image and outputs the access key. The access key is information for accessing the corresponding moving image data stored in the data storage 26. For example, the access key is formed of a predetermined character string formed of numbers, letters, or the like. The reading of the management markers by the management marker reading unit 12 of the information terminal 1 is based on the captured image captured by the imaging unit 11, and a case where the management markers are not read sufficiently or a case where the management markers are read in error according to the capturing conditions or the like may also be considered. Therefore, limiting the moving image data which is the retrieval target in advance using the access key allows for preventing erroneous detection of the moving image data due to the management markers. The access key is uniquely determined by the user who uploaded the moving image data and the range of the moving image data to be retrieved using the management markers is limited to the range of the moving image data uploaded by the user according to the access key.

In addition, the access key issuing unit 27 may, for example, output image data such as a bar code or a two-dimensional code having information relating to the predetermined character string described above as the access key. Examples of the output instructions for the management images include orders or the like for the management print printed with the management images from the user.

The management image generator 28 generates management images based on the edited still image data output from the still image editing unit 24 and the access key output from the access key issuing unit 27, and outputs the management image data. The management image data is associated with the management markers in the same manner as the corresponding moving image data and is stored in the data storage 26. The management markers may be stored in a storage other than the data storage 26. For example, a configuration may be considered in which the management markers and the access information for the moving image data are associated and stored in a storage other than the data storage 26, the access information for the moving image data is acquired using the management markers, and the moving image data stored in the data storage 26 is accessed based on the acquired access information.

The management image trimming unit 29 is configured to receive output instructions for the management image, generate trimmed management images by performing automatic trimming on the management images according to the output medium thereof, and output the trimmed management image data. Examples of an output medium include photographic prints with sizes such as L, 2L, digital scan converter (DSC), and KG, or a photo book or the like having a predetermined frame size.

The image data retrieval unit 30 is configured to search the data storage 26 based on the management markers and the access key and acquire the moving image data associated with the management images. The image data retrieval unit 30 can prevent erroneous detection of the moving image data and shorten the access time to the moving image data by determining the range of the moving image data for performing the retrieval based on the access key, searching the moving image data based on the management markers within the determined moving image data range, and specifying the moving image data.

The server controller 31 is configured to control each section of the image server 2 based on a user instruction from the information terminal 1, a predetermined program recorded in a memory (not illustrated in the diagram), or the like.

FIG. 4 is a schematic diagram illustrating an example of the management print P. In the management print P, management images generated from the moving images and having the still image I associated with the moving image and the access key K are printed on a predetermined medium as an image product.

In addition, the still image I is an edited still image which is selected by the user as described above and subjected to an editing process by the user and the access key K is information for accessing the moving image data associated with the still image I as described above, and is configured here by a 10-character string.

Next, description will be given of an operation for generating the management print P in the content management system of FIG. 1. FIG. 5 is a flow chart of an operation for outputting the management print P. FIGS. 6A to 6E are primarily explanatory diagrams illustrating screen transitions of an operation screen displayed on a touch panel 18 of the information terminal 1 when outputting the management print P.

First, as step S11, moving image data is uploaded (transmitted) from the information terminal 1 to the image server 2. The user confirms the operation screen illustrated in FIG. 6A displayed on the monitor 15 of the information terminal 1 and gives an instruction to transmit the moving image data stored in a memory (not illustrated in the diagram) of the information terminal 1 by operating the touch panel 18. The terminal controller 16 controls the terminal data transmission reception unit 13 upon receiving the instruction to transmit the moving image data from the user and transmits the moving image data stored in the memory (not illustrated in the diagram) from the terminal data transmission reception unit 13 to the image server 2 via the communication line 3.

When the moving image data is transmitted to the image server 2, the server data transmission reception unit 21 of the image server 2 receives the moving image data, stores the moving image data in the data storage 26, and outputs the moving image data to the still image generator 22.

As step S12, the still image generator 22 generates at least one frame of still image data based on the acquired moving image data and outputs the at least one frame of still image data to the still image selecting unit 23. As a representative image of the moving images, for example, an image of a mountain, an image of a car, an image of a ship, an image of parents and children, or the like is generated as a still image and output as still image data.

Figure 6A:
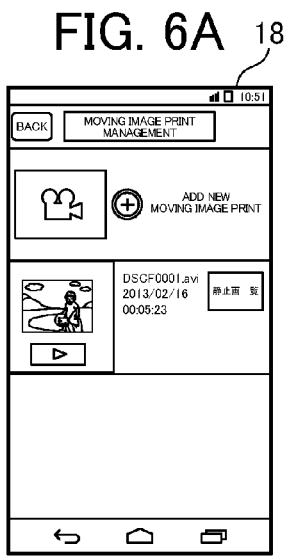
FIGS. 6A to 6E are explanatory diagrams for illustrating a user operation when generating the management print P of FIG. 4.
Figure 6B:
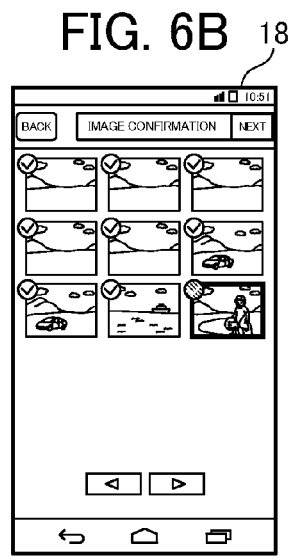

The still image selecting unit 23 acquires the plurality of frames of still image data described above, generates a plurality of pieces of thumbnail image data corresponding to the plurality of frames of still image data, and transmits the plurality of pieces of thumbnail image data to the information terminal 1 via the server data transmission reception unit 21. The information terminal 1 receives the plurality of pieces of thumbnail image data in the terminal data transmission reception unit 13 and displays the plurality of thumbnail image so as to be selectable on the touch panel 18 via the display controller 14. FIG. 6B is a list of thumbnail images displayed so as to be selectable on the touch panel 18. As the thumbnail images, images of mountains (five images), images of cars (two images), images of the sea (one image), and images of parents and children (one image) are displayed.

As step S13, the user selects one still image out of the plurality of still images generated from the moving images by operating the touch panel 18 to select one thumbnail image displayed on the touch panel 18. The information relating to the still image selected by the user is transmitted from the terminal data transmission reception unit 13 to the image server 2 via the terminal controller 16. The server data transmission reception unit 21 of the image server 2 receives the information relating to the selected still image and outputs the information to the still image selecting unit 23. In addition, the still image selecting unit 23 selects one still image out of at least one still image based on the information relating to the selected still image and outputs the image data for the selected still image to the still image editing unit 24 as selected still image data.

The image of parents and children described above is selected and the still image data of the image of parents and children is output as the selected still image data.

The still image editing unit 24 transmits the selected still image data output from the still image selecting unit 23 to the information terminal 1 via the server data transmission reception unit 21. The information terminal 1 receives the selected still image data using the terminal data transmission reception unit 13 and displays the selected still image based on the selected still image data so as to be editable on the touch panel 18 via the display controller 14.

Figure 6C:
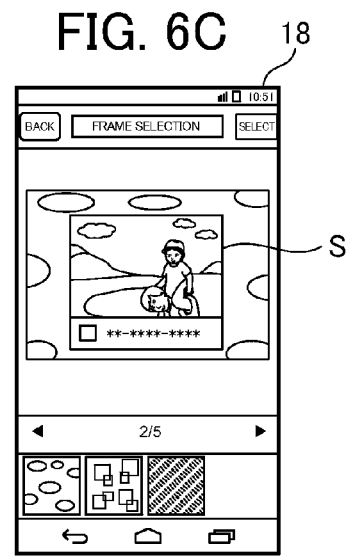
Figure 6D:
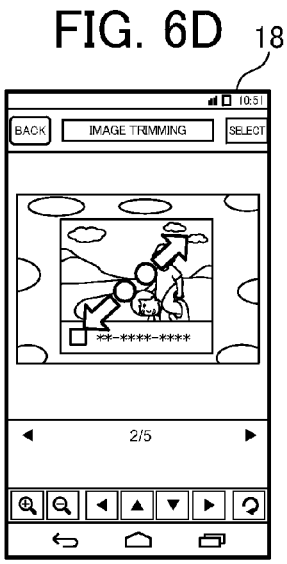

As step S14, the user edits the selected still image displayed on the touch panel 18 and generates edited image data by operating the touch panel 18. Examples of the editing processes performed by the user include selecting a background frame to be the background of the selected still image as illustrated in FIG. 6C and processes of image correction, trimming, enlargement and reduction, rotation, or the like with respect to the selected still image as illustrated in FIG. 6D. The information relating to the editing process with respect to the selected still image is transmitted from the terminal data transmission reception unit 13 to the image server 2 via the terminal controller 16. The server data transmission reception unit 21 of the image server 2 receives the information relating to editing process and outputs the information relating to the editing process to the still image editing unit 24. In addition, the still image editing unit 24 edits the selected still image based on the information relating to the editing process and outputs the image data of the selected still image subjected to the editing process to each of the management marker registration unit 25 and the management image generator 28 as edited still image data.

In addition, the management marker registration unit 25 acquires the edited still image data, and, as step S15, registers the edited still images as management markers based on the edited still image data. Specifically, the image feature amounts of the edited still image are calculated based on a predetermined algorithm by image analysis of the edited still image and the calculated image feature amounts are associated with the corresponding moving image data stored in the data storage 26 as management markers. By associating the management markers with the moving image data and storing both in the data storage 26, the user can retrieve the moving image data based on the management markers.

Figure 6E:
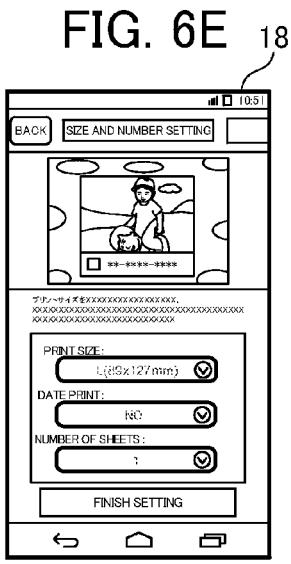

Next, as step S16, the user sends out an instruction to output the management print P by operating the touch panel 18 of the information terminal 1. Specifically, as illustrated in FIG. 6E, the print size, the number of prints, and the like of the management print P are set by the user and the output instruction is given.

When the output instruction is given, the terminal data transmission reception unit 13 transmits the instruction to output the management print P with respect to the image server 2 and the server data transmission reception unit 21 of the image server 2 receives the instruction to output the management print P from the information terminal 1 and outputs the output instruction to the server controller 31.

The server controller 31 sends out an instruction to issue an access key for the moving image data corresponding to the management print P with respect to the access key issuing unit 27. As step S17, the access key issuing unit 27 issues an access key for the moving image data based on the instruction to issue the access key and outputs the access key to the management image generator 28.

In addition, as step S18, the management image generator 28 acquires the access key from the access key issuing unit 27 and acquires the edited still image data from the still image editing unit 24 or the data storage 26, generates a management image in which the edited still image and the access key are displayed, and outputs the management image data to the data storage 26 and the management image trimming unit 29. The management image data is stored in the data storage 26 in association with the moving image data or the like.

In addition, as step S19, based on the instruction to output the management print P acquired from the server controller 31, the management image trimming unit 29 performs a predetermined trimming process on the management image based on the management image data and outputs the trimmed management image data.

As illustrated in Table 1, the relationship between the size of the print image and the aspect ratio is in a range of 1:1.34 to 1:1.50.

TABLE 1

| Size name | Aspect ratio |
| --- | --- |
| L | 1:1.43 |
| DSC | 1:1.34 |
| KG | 1:1.49 |
| 2L | 1:1.40 |
| Photo book frame A | 1:1.34 |
| Photo book frame B | 1:1.41 |
| Photo book frame C | 1:1.50 |

Then, in order to be able to print the management images without cutting the edited still image or the access key which are the management markers no matter what size the medium on which the management images are printed is, as illustrated in FIG. 7A, in a management image PI generated by the management image generator 28, an arrangement area A for the edited still image and the access key is set by taking margins of 3.0% above and below and 2.3% to the left and right, and the aspect ratio of the management image PI is set to 1:1.49.

For example, in a case of printing the management image PI on the medium with a size for DSC, as illustrated in FIG. 7B, the management image trimming unit 29 trims the management image PI according to the frame F-DSC having an aspect ratio with a size for DSC. In addition, in a case of printing the management image PI on, for example, a medium with a KG size, as illustrated in FIG. 7C, the management image trimming unit 29 trims the management image PI according to the frame F-KG having an aspect ratio with a KG size. The trimmed management image trimmed by the management image trimming unit 29 is output to the server data transmission reception unit 21 as trimmed management image data.

The server data transmission reception unit 21 acquires the trimmed management image data from the management image trimming unit 29 and transmits an instruction to output the management print and the trimmed management image data to the printer 4 connected via the communication line 3 based on instructions from the server controller 31.

The printer 4 receives the trimmed management image data and the instruction to output the management print P from the image server 2 and, as step S20, prints the management image based on the trimmed management image data on the medium with a predetermined size according to the output instruction.

From the above, the user uploads the moving image data and selects at least one still image automatically generated based on the moving image data and is able to generate management content based on the moving images and the still image in a simple manner and in a short time simply by giving an instruction to output the still image (here, simply by ordering the image product with a printed still image).

Next, description will be given of an operation for playing back management content based on the management print P in the content management system in FIG. 1. FIG. 8 is a flow chart illustrating a flow for playing back the management content.

As step S21, the user confirms the access key K printed in the management print P and inputs the access key K from the touch panel 18 of the information terminal 1.

Next, as step S22, the user images (captures) the management print P using the imaging unit 11 by operating the information terminal 1. The captured (imaged) management print P is displayed on the touch panel 18 of the information terminal 1.

When the still image portion of the management print P is captured, the management marker reading unit 12 of the information terminal 1 carries out image analysis of the captured image on the basis of a predetermined algorithm based on the captured image data output from the imaging unit 11 and reads the management markers from the still image I appearing in the captured image as step S23.

The information terminal 1 transmits the above-described access key K and the above-described management marker to the image server 2 as the subsequent step S24 and the image server 2 receives the access key K and the management marker transmitted from the information terminal 1 and retrieves the plurality of pieces of moving image data stored in the data storage 26 based on the access key K and the management marker using the image data retrieval unit 30. Specifically, the image data retrieval unit 30 limits the plurality of pieces of moving image data which is the retrieval target according to the access key K and retrieves the moving image data within the range limited by the management marker.

The retrieved moving image data are transmitted to the information terminal 1 via the server data transmission reception unit 21 and the information terminal 1 receives the moving image data in the terminal data transmission reception unit 13.

Finally, as step S25, the information terminal 1 plays back the moving images based on the moving image data in a display portion of the still image I of the management print P displayed on the touch panel 18.

From the above, the user inputs the access key K contained in the management print P in the information terminal 1 and is able play back the moving images corresponding to the still images printed on the management print P simply by capturing the management print P.

The access key K illustrated in FIG. 4 is a 10 digit number. However, the input of the access key K by the user may be omitted by setting the access key K to be a two-dimensional code, a bar code, or the like and reading the two-dimensional code, the bar code, or the like from the captured image in the information terminal 1.

In addition, in the content management system according to one embodiment described above, an editing process is performed on the selected still image based on the selected still image data, such as setting the background frame, image correction such as color correction, trimming, enlargement and reduction, or rotation. However, the editing processes described above are not essential processes and the still image editing unit 24 may output the selected still image data to each of the management marker registration unit 25 and the management image generator 28 without performing any editing process. In addition, the content management system of the invention need not be provided with the still image editing unit 24.

In addition, in relation to the selection of the still image in the still image selecting unit 23 or the still image editing processes in the still image editing unit 24, the information terminal 1 may play back the moving images corresponding to the still image selection or the still image editing process.

Specifically, as illustrated in FIG. 9, in a case of creating the management print P by trimming the portion surrounded by the dotted line T in the selected still image S, the still image selecting unit 23 records the time code of the frame of the moving image corresponding to the selected still image and the display controller 14 may play back the moving image from the same frame as the selected still image based on the time code described above when playing back the corresponding moving image using the information terminal 1.

In addition, the still image editing unit 24 also records the information relating to the dotted line T for performing trimming and the display controller 14 may play back the moving image at the same frame as the selected still image and with the range of the trimmed dotted line T enlarged based on the time code and the trimming information described above when the corresponding moving image is played back by the information terminal 1.

Furthermore, image analysis may be carried out on the trimmed range and the moving images may be played back so as to follow the movement of a person, an animal, a vehicle or the like appearing in the trimmed range. Specifically, the moving images may be played back while being trimmed such that the person or the like described above is positioned in the center of the display screen.

In addition, description was given with the content management system according to the embodiment described above being divided into the roles of the information terminal 1 on the client side and the image server 2 on the server side. However, for example, without providing the management marker reading unit 12 in the information terminal 1, the captured image data from the information terminal 1 may be transmitted to the image server 2 and the management marker may be read from the captured image based on the captured image data by setting the management marker registration unit 25 of the image server 2 to be the management marker reading unit 12. In addition, for example, without providing the still image editing unit 24 in the image server 2, the selected still image data may be transmitted from the image server 2 to the information terminal 1 and the editing process may be performed on the selected still image in the information terminal 1. Each section of the information terminal 1 and the image server 2 may be configured to be arranged in either of the information terminal 1 and the image server 2.

The management marker described above is the still image itself or a feature amount of the still image which can be extracted from the still image using a predetermined algorithm. However, any type of information may be used without being limited thereto as long as the information can specify the storage location and the size of the moving image data associated with the still image.

In addition, the management markers described above are stored in the storage or the like in the embodiment described above. However, instead of storing the management markers themselves, for example, information relating to the forming and extraction of the management markers may be stored, such as from which frame of the moving image the still image selected by the user is extracted, at which size the image is extracted, in which manner the management markers are generated, or in which manner the management markers are specified. This is because the management markers themselves can be appropriately generated based on the information relating to the forming and extracting of the management markers.

The access key described above is formed of a predetermined character string or a bar code or a two-dimensional code having information relating to a predetermined character string; however, without being limited to such a configuration, for example, an IC tag may be embedded in the image product, the information relating to the access key may be input in the IC tag, and the access key may be inputted by reading the IC tag using the information terminal. In addition, information relating to the access key may be embedded in the management image as an electronic watermark, and the access key may be inputted by reading the electronic watermark using the information terminal. Various well-known techniques can be used in the embedding of the access key in the management image and the acquisition of the access key from the management image, and configurations in which the user is not able to see the access key or in which it is difficult for the user to see the access key may be adopted.

In addition, the access key described above is uniquely determined by the user uploading the moving image data; however, without being limited thereto, for example, an access key may be issued in units corresponding to folders for managing the moving image data, in addition, for example, access keys may be issued in units for a community or the like on an SNS related to the moving image data. The content management system of the invention can selectively issue the access key according to the management range or the management method of the content.

In addition, the moving images and still images described above may be three-dimensional content as well as two-dimensional content.

In addition, the content management system according to the invention is effective from the point of view of managing moving image data using management images having an access key and a still image.

The user can quickly access corresponding moving image data from a management print having management images without being conscious in any way of the storage destination or the like of the moving image data. Furthermore, as described above, as long as the management image and the time code of the moving image data are associated, the user is able to instantly call up scenes corresponding to the management image appearing in the management print without performing an operation on the moving images.

Next, description will be given of a content management system which generates management image data including still image data of a plurality of still images automatically extracted from moving images and which, when a still image included in the management image print is captured, plays back scenes of the corresponding moving images.

Because the configuration of the content management system of the embodiment is the same as the content management system illustrated in FIG. 1 to FIG. 3 except for the image server 2, description will be given below of the image server of the embodiment.

Figure 10:
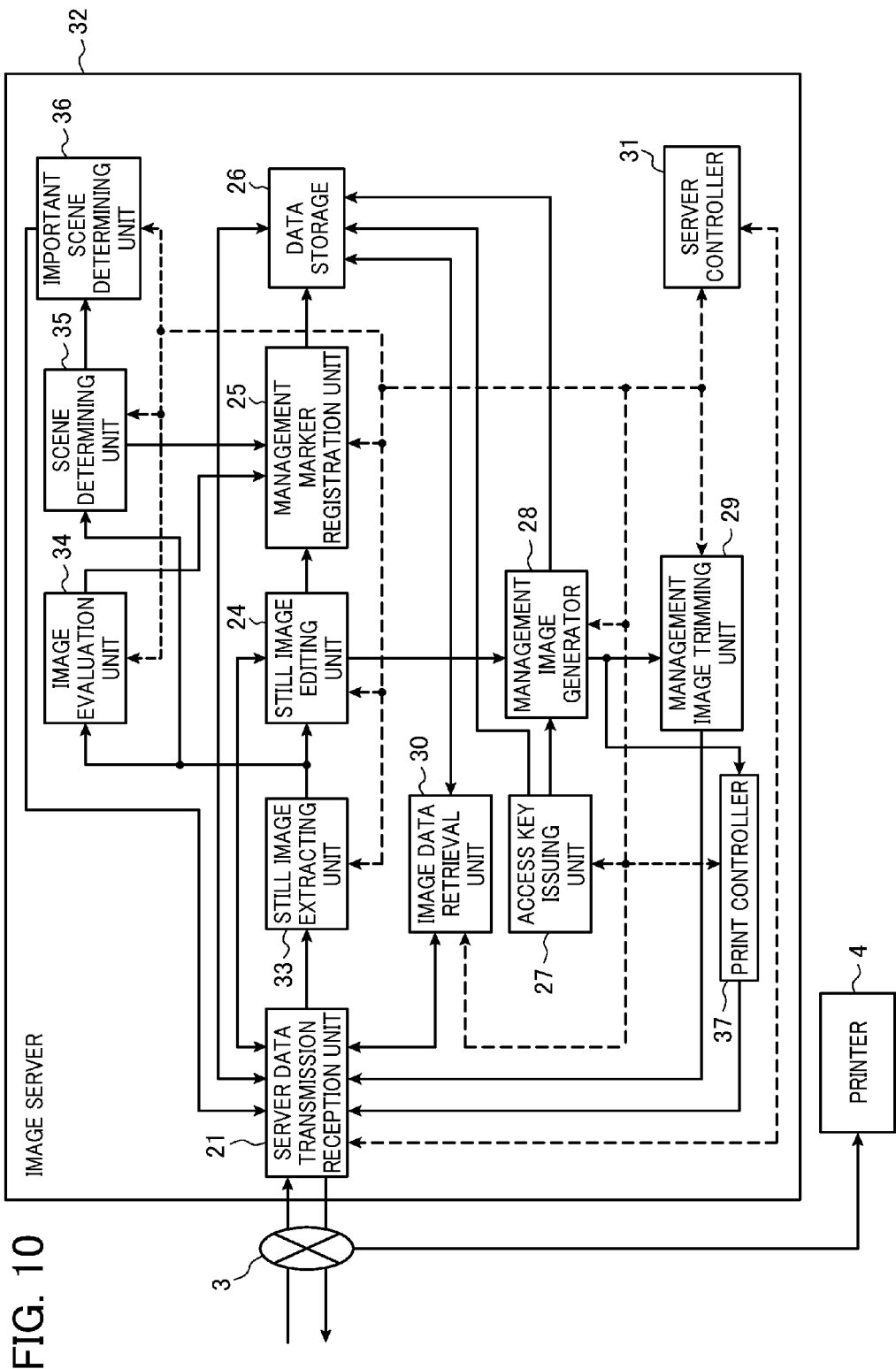
FIG. 10 is a block diagram illustrating a detailed configuration of an image server according to another embodiment of the invention.

FIG. 10 is a block diagram illustrating a detailed configuration of an image server according to another embodiment of the invention. An image server 32 of the embodiment illustrated in FIG. 10 is the image server 2 illustrated in FIG. 3, which provided with a still image extracting unit 33 instead of the still image generator 22 and the still image selecting unit 23. In addition, the image server 32 is the image server 2 illustrated in FIG. 3, further provided with an image evaluating unit 34, a scene determining unit 35, an important scene determining unit 36, and a print controller 37.

The still image extracting unit 33 is configured to extract a plurality of frames of still image data from the moving image data and automatically extract still image data of two or more still images corresponding to a best shot scene (a scene optimally representing the motion of a person filmed in the moving images) from among the plurality of frames of extracted still image data. Description will be given below of the details of the still image extracting unit 33.

Subsequently, the image evaluating unit 34 is configured to calculate an evaluation value by evaluating each of the plurality of still images corresponding to the two or more frames of still image data automatically extracted by the still image extracting unit 33.

The image evaluating unit 34 is able to evaluate the still images based on at least one out of the faces of persons included in the still image, blurring, shaking, color, and brightness of the still image. For example, the evaluation value is calculated to be high in cases where the position of the person's face is in the central section of the output still image, the size of the person's face is a threshold value or greater, the degree of blurring and shaking is less than a threshold value, the color or the brightness is within a set range, or the like.

Subsequently, the scene determining unit 35 is configured to determine the scenes of the moving images including the still images corresponding to the still image data for each of the two or more frames of still image data extracted by the still image extracting unit 33.

Figure 11:
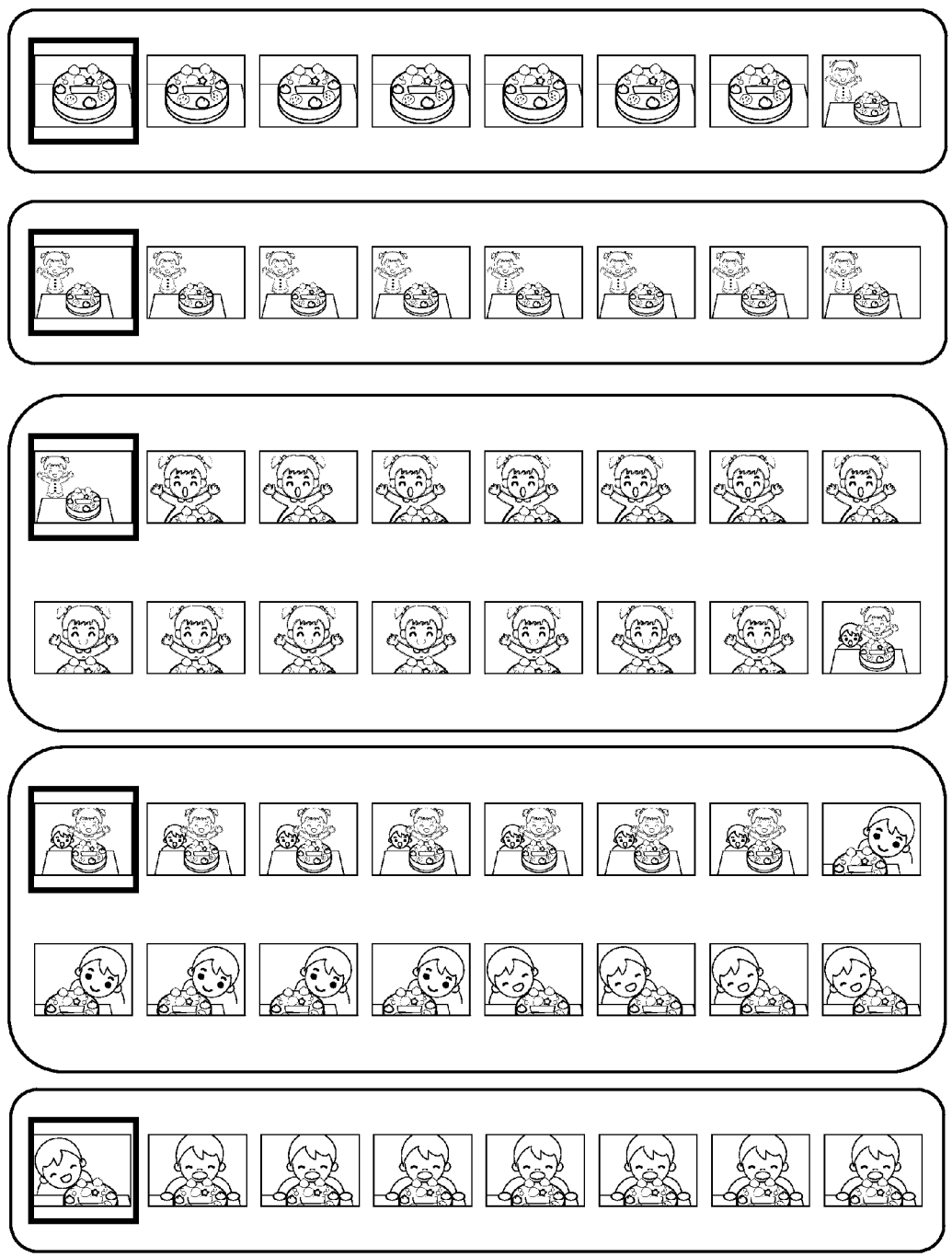
FIG. 11 is a conceptual diagram representing a state in which scenes of moving images are divided.

For example, as illustrated in FIG. 11, in a case where the degree of change in the colors between the two still images which are adjacent in order of the filming time in the moving images exceeds a threshold value, the scene determining unit 35 determines that the scene of the moving images has changed and divides the scenes of the moving images between the two adjacent still images for which the degree of change in the color exceeds the threshold value. This determination can divide the moving images into a plurality of scenes.

In the example illustrated in FIG. 11, the plurality of still images extracted from the moving images are lined up in order from left to right and from top to bottom and in order from the oldest to the latest filming time, and the scenes of each of the divided moving images are illustrated surrounded by different frames.

Then, the scenes of the moving images including the still images corresponding to each of the two or more frames of still image data extracted by the still image extracting unit 33 are determined from among the plurality of scenes of the divided moving images.

Subsequently, the important scene determining unit 36 is configured to determine the importance of the scenes of the moving images determined by the scene determining unit 35.

The important scene determining unit 36 is able to calculate the importance of the scenes of the moving image based on, for example, the length of the scenes of the moving images (filming time), the frequency with which the scenes of the moving images occur (scene similarity), the number of times of play back, and the like. For example, the importance is determined to be higher as the length of the scene of the moving images increases and as the frequency with which the scenes of the moving images occur increases. In addition, the importance is determined to be higher as the number of times of play back of the scenes of the moving image is increased.

Subsequently, the print controller 37 is configured to control the size of the print on which the management images corresponding to the management image data are printed according to the number of frames of still image data included in the management image data.

The print controller 37 is able to carry out control so that the size of the print on which the management images are printed is increased as the number of frames of still image data included in the management image data increases.

Next, description will be given of the still image extracting unit 33.

Figure 12:
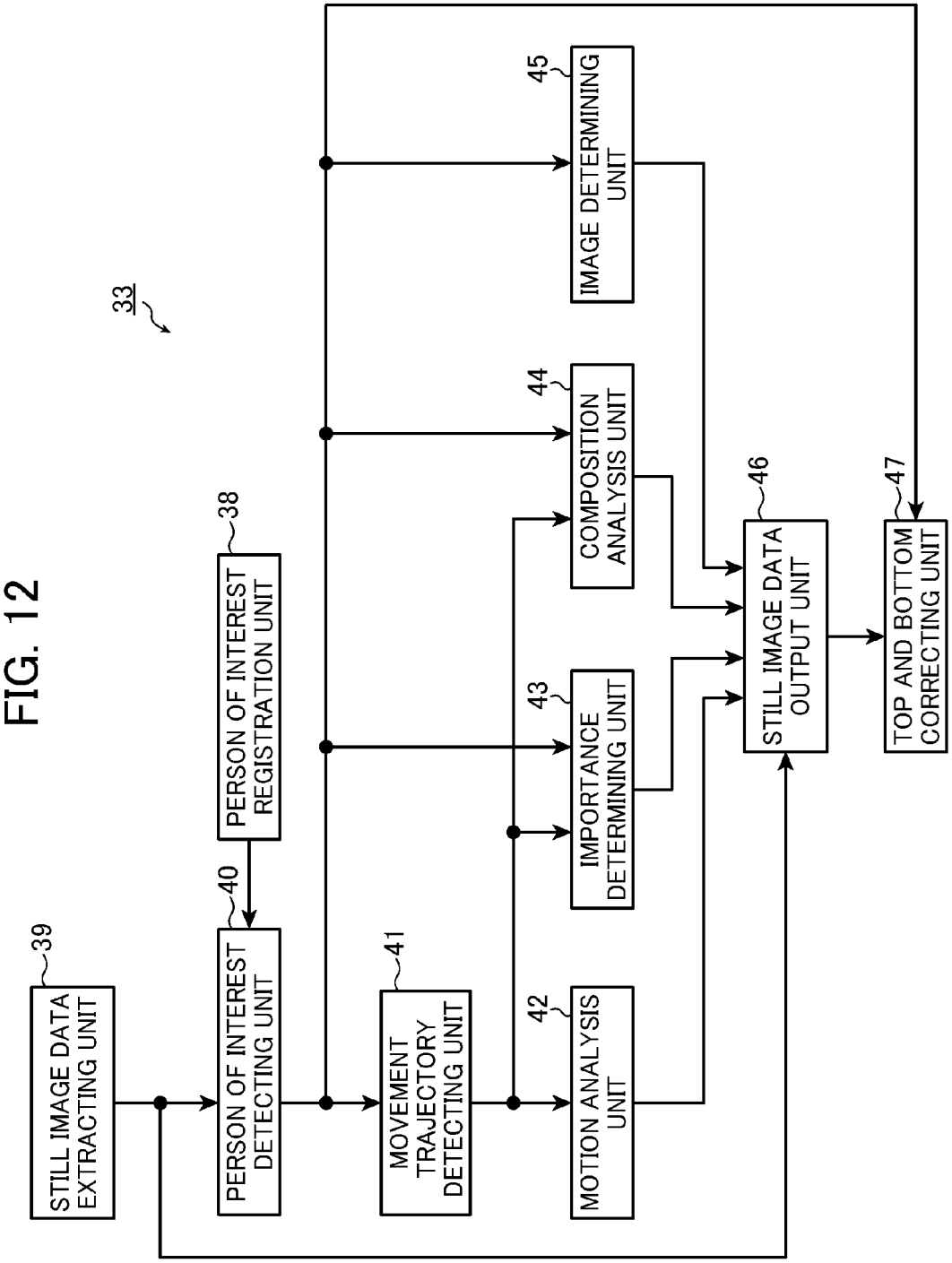
FIG. 12 is a block diagram of one embodiment representing a configuration of an image processing device of the invention.

FIG. 12 is a block diagram of one embodiment representing the configuration of the still image extracting unit. The still image extracting unit 33 illustrated in FIG. 12 is configured to automatically detect the best shot scene from the moving images and output the still image data of the still images corresponding to the best shot scenes. The still image extracting unit 33 is provided with a person of interest registration unit 38, a still image data extracting unit 39, a person of interest detecting unit 40, a movement trajectory detecting unit 41, a motion analysis unit 42, an importance determining unit 43, a composition analysis unit 44, an image quality determining unit 45, a still image data output unit 46, and a top and bottom correcting unit 47.

The person of interest registration unit 38 is configured to register the person of interest who is a processing target as a registered person out of the persons filmed in the moving images corresponding to the moving image data.

The person of interest registration unit 38 is, for example, able to register persons specified by the user as registered persons out of the persons filmed in the moving images. In addition, the person of interest registration unit 38 is able to register the images of the registered persons (facial images or the like for specifying the person of interest).

Subsequently, the still image data extracting unit 39 is equivalent to the still image generator 22 illustrated in FIG. 3 and is configured to extract a plurality of frames of still image data from the moving image data.

The still image data extracting unit 39 is able to, for example, extract still image data of all of the frames (each frame) of the moving image data. However, the invention is not limited thereto and may extract still image data of one frame every certain number of frames, for example, every two frames. In addition, only the still image data of frames at optionally set segments in the moving images corresponding to the moving image data may be extracted.

Subsequently, the person of interest detecting unit 40 is configured to detect a person of interest that is a person who is a processing target from among each of a plurality of still images corresponding to a plurality of frames of still image data extracted from the moving image data by the still image data extracting unit 39.

The person of interest detecting unit 40 can specify a person (persons having a threshold similarity or greater) matching or similar to the registered person from among the detected persons as a person of interest by detecting the presence or absence of persons in each of the plurality of still images and comparing (comparing facial images or the like) images of the detected person and, for example, images of a registered person registered in the person of interest registration unit 38.

Alternatively, by extracting the faces of persons from among each of the plurality of still images and performing central person determination with respect to the facial images of the faces of the persons which are extracted, the person of interest detecting unit 40 can specify a person, who is determined as a central person by the central person determination, as a person of interest from among the persons whose faces are extracted.

In the central person determination, for example, same-person determining processing is performed with respect to a plurality of facial images and the plurality of facial images are classified into image groups formed of facial images of the same person. Subsequently, one or more persons out of the persons classified into image groups is determined as the main character and one or more persons with high relevance to the main character are determined to be important persons out of the persons other than the main character.

The central person determination can also specify persons corresponding to each of the image groups based on facial images of each of the registered persons registered in the person of interest registration unit 38.

For example, the person for whom the number of detected facial images is greatest can be determined as the main character, and, out of the persons other than the main character, the persons filmed with the main character in a large number of still images can be determined as important persons.

In addition, the distance between the facial image of the main character and the facial image of the persons other than the main character filmed in the same still image may be calculated and persons for whom the distance between the facial images is close may be determined as important persons.

Important persons may be determined based on one or both of the difference between the filming time information relating to the still images in which the main character is filmed and the filming time information relating to the still images in which persons other than the main character are filmed and the difference between filming position information of the still images in which the main character is filmed and the filming position information of the still images in which persons other than the main character are filmed.

In addition, the person of interest detecting unit 40 is able to detect the position of the person of interest, the size of the person of interest, the region of the person of interest, the region of the upper body of the person of interest, the position of the face of the person of interest, the size of the face of the person of interest, the facial region of the person of interest, the orientation of the face of the person of interest, and the like in the still images.

Because methods for detecting the person of interest and for detecting the face of the person of interest and the like in still images are known, detailed description thereof will be omitted here and the specific detection methods are not limited in any way. In addition, the method for detecting the person of interest is not limited in any way.

Subsequently, the movement trajectory detecting unit 41 is configured to detect the movement trajectory of the person of interest by tracking the movement of the person of interest in the moving images corresponding to the moving image data based on the detection results of the person of interest in the plurality of still images from the person of interest detecting unit 40. In addition, the movement trajectory detecting unit 41 can detect the length of the movement trajectory of the person of interest, the movement pattern of the person of interest, and the like by detecting the movement trajectory of the person of interest.

Figure 13A:
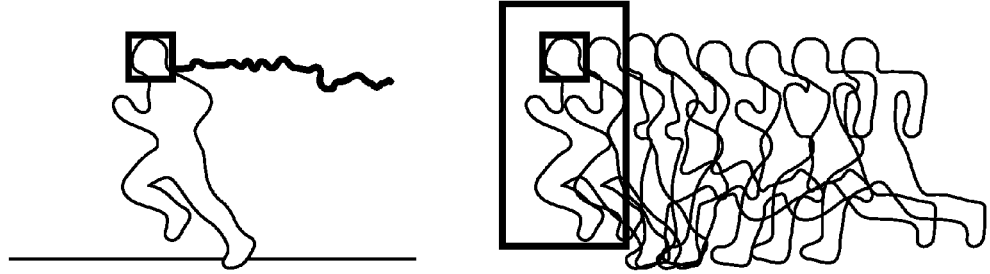
FIGS. 13A to 13C are conceptual diagrams of an example representing a movement trajectory of a person of interest (left side) and conceptual diagrams representing a motion history image of a person of interest (right side).
Figure 13B:
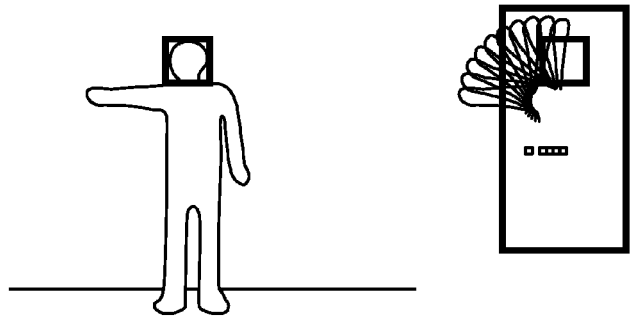
Figure 13C:
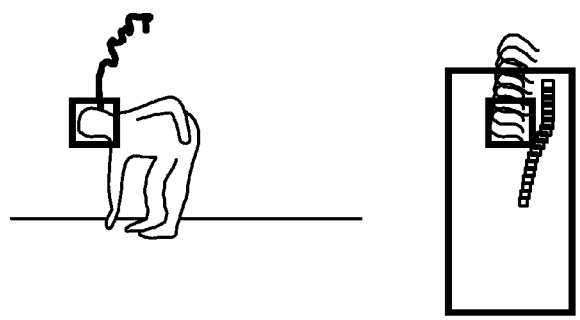

The movement trajectory detecting unit 41 can use a movement trajectory representing the trajectory in which a region of interest (ROI), for example, a facial region of the person of interest, moves in the form of a line as illustrated on the left side in FIGS. 13A to 13C as the movement trajectory of the person of interest. In addition, as the movement trajectory of the person of interest, a motion history image (MHI) may be used as illustrated on the right side of FIGS. 13A to 13C. The motion history image represents the history of the motion of the person of interest, for example, by changing color at set time intervals. Using the motion history image allows for knowing the position of the person of interest, the size of the person of interest, the moving location of the person of interest, the moving direction of the person of interest, or the like in the motion history image.

The movement trajectory detecting unit 41 can track the movement of the person of interest in the moving images based on the facial region of the person of interest by, for example, comparing the facial region of the person of interest in the still image of the present frame with a detection region at an optionally set position corresponding to the facial region of the person of interest in the still image of the next frame and detecting to which position the facial region of the person of interest in the still image of the present frame moves in the detection region in a still image of the next frame based on a detection region position in the still image of the next frame where similarity with the facial region of the person of interest in the still image of the present frame is a threshold value or greater.

It may be difficult to track the movement of the person of interest simply by detecting the facial region of the person of interest because the position of the person of interest, the size of the person of interest, and the like in the still image change in accordance with the passing of time. In such a case, in addition to the facial region of the person of interest, by dividing the region of the upper body of the person of interest into a set number of regions, for example, four, and tracking the movement of the person of interest in the same manner for each of a total of five regions, the tracking success rate can be improved.

In addition, in a case where the similarity between the facial region of the person of interest in the still image of the present frame and the detection region in the still image of the next frame is determined, in order to detect the detection region at the position, which corresponds to the facial region of the person of interest in the still image of the present frame, in the still image of the next frame, it is necessary to successively repeat the calculation of the sum of the brightness values of all of the pixels included in the detection region at an optional position for detection regions at a plurality of positions. Therefore, the amount of calculation in order to calculate the sum of the brightness values for every frame is enormous.

In such a case, generating an integral image with the still image of the next frame (that is, each of the frames) and calculating the sum of the brightness values using the generated integral image allows for reducing the amount of calculation and increasing the speed of the process. The integral image is, for example, an image in which, when the coordinates of the pixels of the still image are increased from the left of the still image to the right and from the top to the bottom, the integral value for the pixels at each coordinate is the brightness values from the top left pixel up to the pixels at each coordinate.

Because a method for calculating the sum of the brightness values for all of the pixels included in the region corresponding to the facial region of the person of interest using an integral image is known, detailed description thereof will be omitted here. In addition, in a case of tracking the movement of the person of interest, various types of methods, for example, such as the mean shift method, can be used with the objective of reducing the amount of calculation or increasing the processing speed without being limited to using an integral image. Because the mean shift method is also known, detailed description thereof will be omitted.

Subsequently, the motion analysis unit 42 is configured to analyze the motion of the person of interest in the moving image based on the movement trajectory of the person of interest detected by the movement trajectory detecting unit 41, for example, the movement trajectory of a region of interest such as a facial region, and calculate evaluation values with respect to the motion of the person of interest based on the analyzed motion of the person of interest for each of a plurality of still images.

The motion analysis unit 42 analyzes the motion of the person of interest by defining in advance the movement trajectory with respect to the motion of the person of interest, for example, the movement trajectory when the person of interest is running and detecting a portion which is similar to the movement trajectory defined in advance from among the movement trajectories of the person of interest detected by the movement trajectory detecting unit 41. Then, in a case where the motion of the person of interest is a running motion, the motion analysis unit 42 can calculate evaluation values with respect to the motion of the person of interest according to the type of motion of the person of interest so as to find the evaluation value.

In addition, the motion analysis unit 42 is able to analyze the motion of the person of interest and to calculate the evaluation value with respect to the motion of the person of interest based on the motion history image as illustrated on the right side of FIGS. 13A to 13C as the movement trajectory of the person of interest.

By analyzing the motion of the person of interest based on the motion history image, the motion analysis unit 42 can recognize that the person of interest is running from the right side to the left side as illustrated on the right side of FIG. 13A, that the person of interest moves only their right hand in a stationary state as illustrated on the right side of FIG. 13B, that the person of interest is picking up an object fallen on the floor as illustrated on the right side of FIG. 13C, or the like in FIGS. 13A to 13C. In addition, the motion analysis unit 42 can calculate evaluation values with respect to the motion of the person of interest based on whether or not the person of interest is moving, at what position, the direction of the movement, and the like.

Subsequently, the importance determining unit 43 is configured to determine the importance of each of a plurality of still images based on at least one out of the length of the movement trajectory of the person of interest, the position of the person of interest in the still images, and the size of the person of interest in the still images, and calculates the evaluation values of the importance based on the importance determined for each of the plurality of still images.

For example, in a case where the movement trajectory of the person of interest is long (in a case where the length is a threshold value or greater), it can be estimated that the degree of interest of person filming is high with respect to the person of interest. Therefore, the importance determining unit 43 determines that the importance of the still images corresponding to scenes where the movement trajectory of the person of interest is long among the moving images is high. In addition, the importance of still images in which the person of interest is filmed in the central section or of still images in which the person of interest is filmed so as to appear large (the size of the person of interest is a threshold value or greater) is determined to be high. Then, the higher the importance, the greater the importance evaluation value is calculated to be.

Subsequently, the composition analysis unit 44 is configured to analyze the quality of the compositions of each of the plurality of still images based on at least one out of the position of the person of interest in the still images, the size of the person of interest in the still images, and the movement pattern of the person of interest, and calculate the evaluation value of the compositions based on the analyzed quality of the compositions for each of the plurality of still images.

The composition analysis unit 44 carries out analysis in which the compositions of the still images in which the person of interest is filmed in the central section or the still images in which the person of interest is filmed to appear large (the size of the person of interest is a threshold value or greater) are better than the compositions of still images in which the person of interest is not filmed in the central section or still images in which the person of interest is not filmed to appear large. This analysis allows for carrying out calculation so that the evaluation values of the compositions of the still images analyzed as good are greater than the evaluation values of the compositions of the still images which are not analyzed as good.

In addition, the composition analysis unit 44 defines in advance a movement pattern of the person of interest, for example, a movement pattern in which a person of interest moves from the left end to the right end of the moving image and detects a portion in which the person of interest moves with the movement pattern defined in advance from among the movement trajectories of the person of interest detected by the movement trajectory detecting unit 41. Then, the composition analysis unit 44 analyzes the composition of the still images corresponding to the portion in which the person of interest moves with the movement pattern defined in advance as good, and can carry out calculation so that the evaluation values of the compositions of the still images analyzed as good are greater than the evaluation values of the compositions of the still images which are not analyzed as good.

Subsequently, the image quality determining unit 45 is configured to determine the image quality for each of the plurality of still images based on the region of the person of interest in the still images, for example, the region of interest such as the facial region, and calculate the evaluation values of the image quality based on the determined image quality for each of the plurality of still images.

For the still images extracted from the moving images, the image quality may be good or bad depending on the compression format of the moving image data. In addition, there are cases where blurring or shaking occur in the still image due to being out-of-focus, camera shaking, or the like, or cases where the brightness, hue, contrast value, or the like are not appropriate. However, even when the image quality of the background or the like is bad, in a case where the image quality of the facial region or the body region of the person of interest which is the region of interest is good, the image quality determining unit 45 determines the image quality of the still image as good. Then, the image quality determining unit 45 can calculate, for the still images for which the image quality is determined as good, the evaluation value of the image quality to be greater as the image quality is better.

Subsequently, from among the plurality of still images extracted by the still image data extracting unit 39 from the moving image data, the still image data output unit 46 is configured to output still image data of the still images where the evaluation value with respect to the motion of the person of interest, or where the overall evaluation value of at least one evaluation value out of the evaluation value with respect to the motion of the person of interest, the evaluation value of the importance, the evaluation value of the composition, and the evaluation value of the image quality is a threshold value or greater, as the still image data of the still images corresponding to the best shot scenes.

Finally, the top and bottom correcting unit 47 is configured to correct the top and bottom of the still image corresponding to the still image data output from the still image data output unit 46 so that the top and bottom of the still image corresponding to the still image data output from the still image data output unit 46 are the same as the top and bottom of the filming device when the moving images were filmed based on the orientation of the face of the person of interest detected by the person of interest detecting unit 40.

Figure 14A:
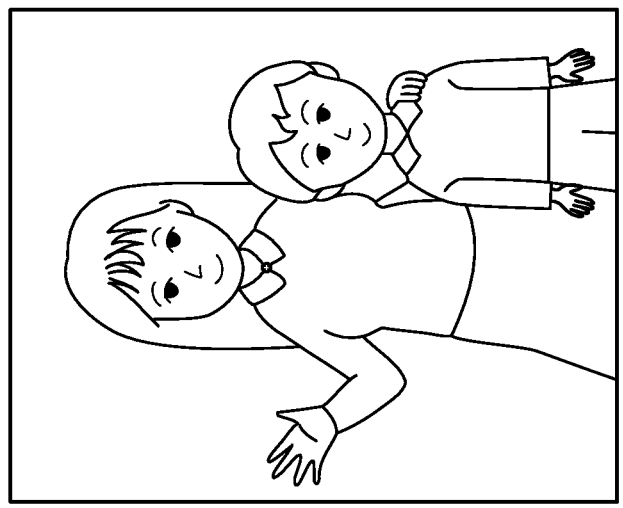
FIG. 14A is a conceptual diagram of an example representing a still image rotated 90° to the left and FIG. 14B is a conceptual diagram of an example representing a still image of which the top and bottom are corrected by rotating the still image illustrated in FIG. 14A 90° to the right.
Figure 14B:
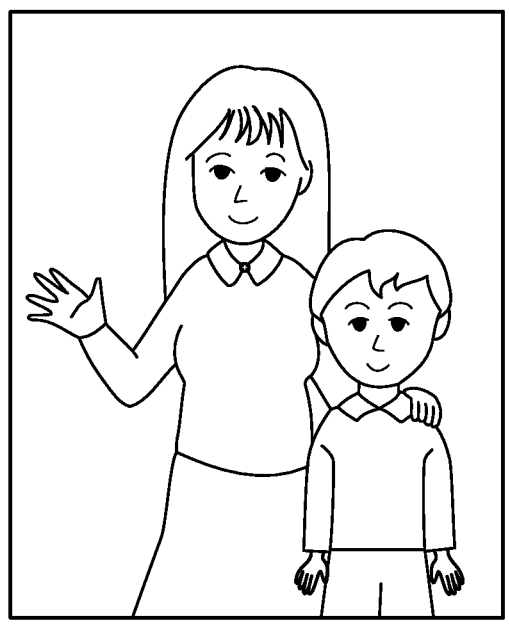

FIG. 14A is a conceptual diagram of an example representing a still image rotated 90° to the left. Such still images are obtained by filming with the filming device rotated 90° to the right when filming the moving images. The top and bottom correcting unit 47 can correct the top and bottom of the still images as illustrated in FIG. 14B by rotating the still image illustrated in FIG. 14A 90° to the right so that the top and bottom of the still image are the same as the top and bottom of the filming device when the moving images were filmed.

In a case where two or more persons are registered in the person of interest registration unit 38, the person of interest detecting unit 40 is able to successively identify the detected person of interest by detecting each of the two or more persons of interest from among the plurality of still images. In addition, in such a case, the movement trajectory detecting unit 41, the motion analysis unit 42, the importance determining unit 43, the composition analysis unit 44, the image quality determining unit 45, the still image data output unit 46, and the top and bottom correcting unit 47 perform successive processes for each of the two or more persons of interest.

Next, description will be given of the operation of the still image extracting unit 33 illustrated in FIG. 12 referring to the flow chart illustrated in FIG. 15.

Figure 15:
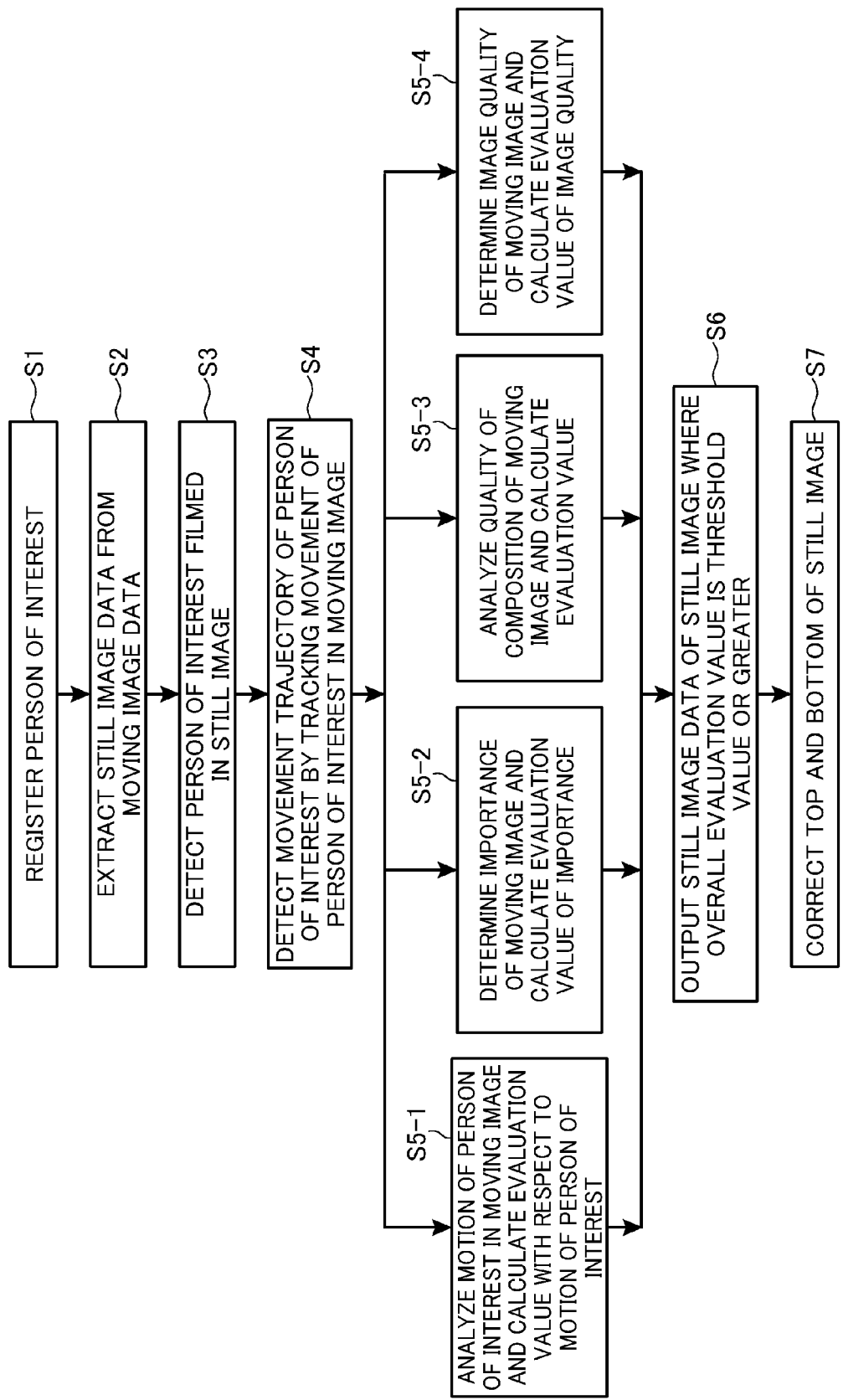
FIG. 15 is a flow chart of an example representing an operation of the image processing device illustrated in FIG. 12.

As illustrated in the flow chart in FIG. 15, first, for example, a person specified by the user is registered as the person of interest out of the persons filmed in the moving image using the person of interest registration unit 38 (step S1).

Figure 16:
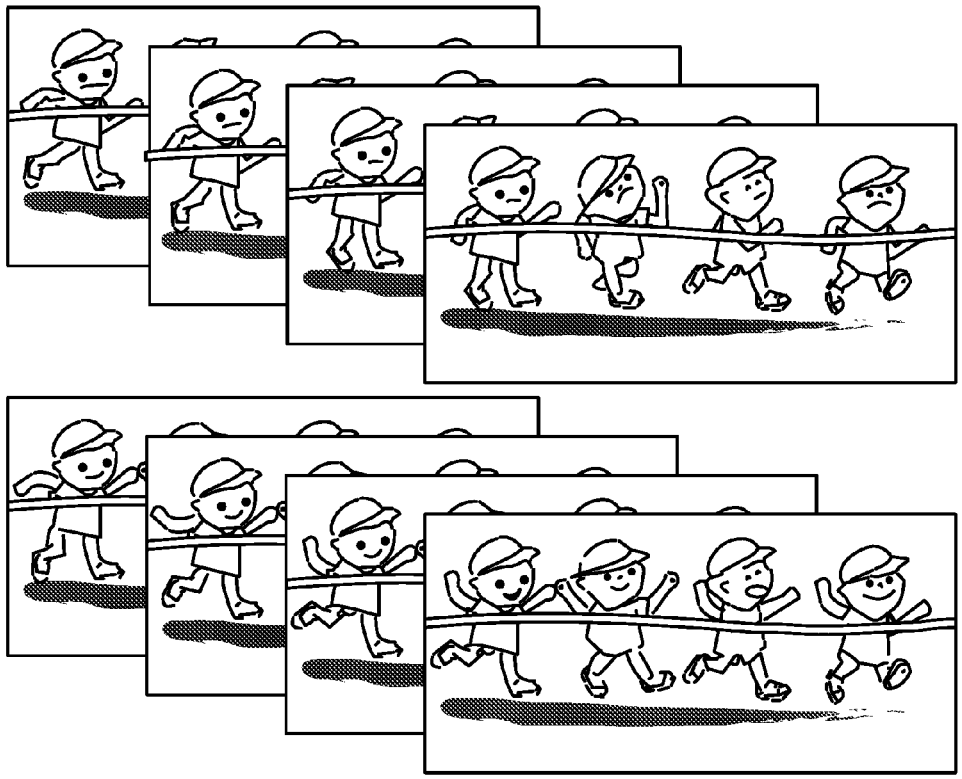
FIG. 16 is a conceptual diagram of an example representing a state in which still images of all of the frames are extracted from moving images.

Subsequently, for example, the still image data of all of the frames is extracted by the still image data extracting unit 39 from the moving image data (step S2). That is, the still images of all of the frames are extracted from the moving images as illustrated in FIG. 16.

The registration of the person of interest may be performed after extracting the still image data from the moving image data.

Figure 17:
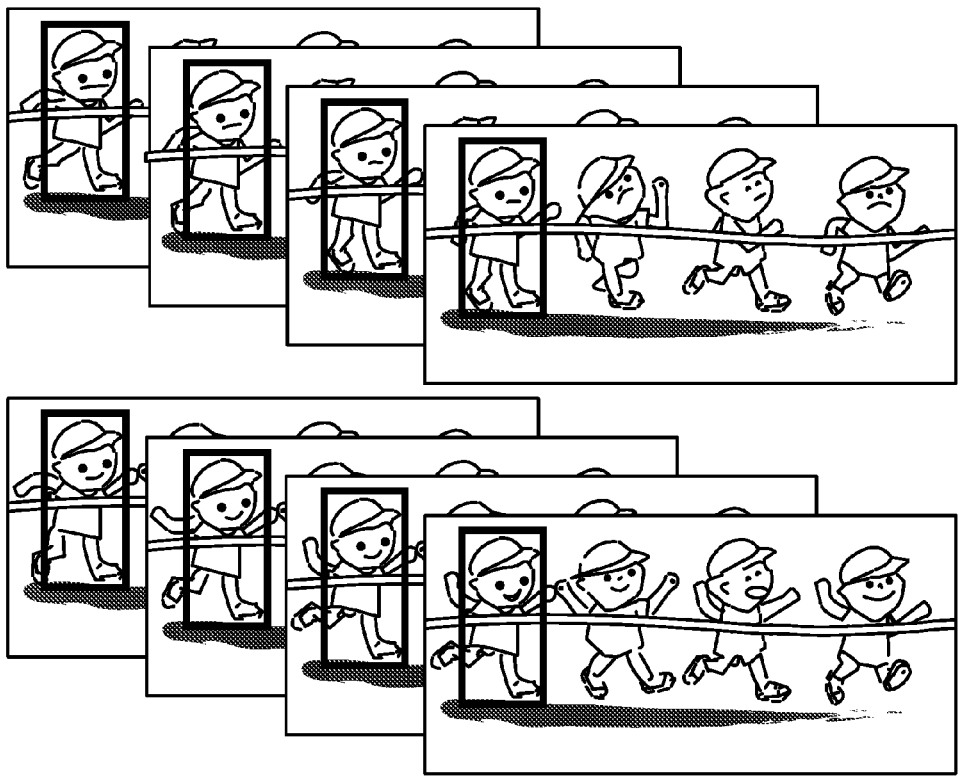
FIG. 17 is a conceptual diagram of an example representing a state in which a region of a person detected from each of the still images of all of the frames illustrated in FIG. 16 is surrounded by a frame.

Subsequently, the person of interest registered in the person of interest registration unit 38 is detected by the person of interest detecting unit 40 from among each of the still images of all of the frames extracted by the still image data extracting unit 39 (step S3). Because of this, the person of interest is specified for each of the still images of all of the frames and enclosed by a frame as illustrated in FIG. 17, and the position of the person of interest, the size the person of interest, the region of the person of interest, and the like are detected in each of the still images of all of the frames.

Subsequently, based on the detection results of the person of interest in the still images of all of the frames by the movement trajectory detecting unit 41, the movement trajectory of the person of interest is detected by tracking the movement of the person of interest in the moving images, for example, the movement of the region of interest illustrated in FIG. 17 as being surrounded by the frame (step S4). This detection by tracking the movement allows for, for example, as the movement trajectory of the person of interest, the movement trajectory of a region of interest such as facial region is represented in the form of a line as illustrated on the left side of FIGS. 13A to 13C, obtaining a motion history image as illustrated on the right side of FIGS. 13A to 13C.

Subsequently, the motion of the person of interest in the moving images is analyzed by the motion analysis unit 42 based on the movement trajectory of the person of interest detected by the movement trajectory detecting unit 41. Then, the evaluation value with respect to the motion of the person of interest is calculated for each of the still images of all of the frames based on the analyzed motion of the person of interest (step S5-1).

In addition, the importance of each of all of the still images is determined by the importance determining unit 43 based on the length of the movement trajectory of the person of interest, the position of the person of interest in the still image, and the size of the person of interest. Then, the evaluation values of the importance are calculated for each of the still images of all of the frames based on the determined importance (step S5-2).

In addition, the quality of the compositions of each of all of the still images is analyzed by the composition analysis unit 44 based on the position of the person of interest, the size of the person of interest, and the movement pattern of the person of interest in the still images. Then, the evaluation value of the composition is calculated based on the quality of the analyzed compositions for each of the still images of all of the frames (step S5-3).

In addition, the image quality of each of the still images of all of the frames is determined by the image quality determining unit 45 based on the region of the person of interest in the still images. Then, for each of all of the still images, the evaluation value of the image quality is calculated according to the determined image quality and the degree of blurring and shaking in the case of the embodiment (step S5-4).

For example, after determining the blurring and shaking of the region of interest illustrated in FIG. 14 as surrounded by the frame, the evaluation value of the image quality is calculated to be lower as the degree of blurring and shaking is greater.

The order for calculating the evaluation value with respect to the motion of the person of interest, the evaluation value of the importance, the evaluation value of the composition, the evaluation of the image quality is not limited at all, and the calculation can be carried out in an optional order. In addition, these evaluation values can be also calculated in parallel, that is, at the same time.

Figure 18:
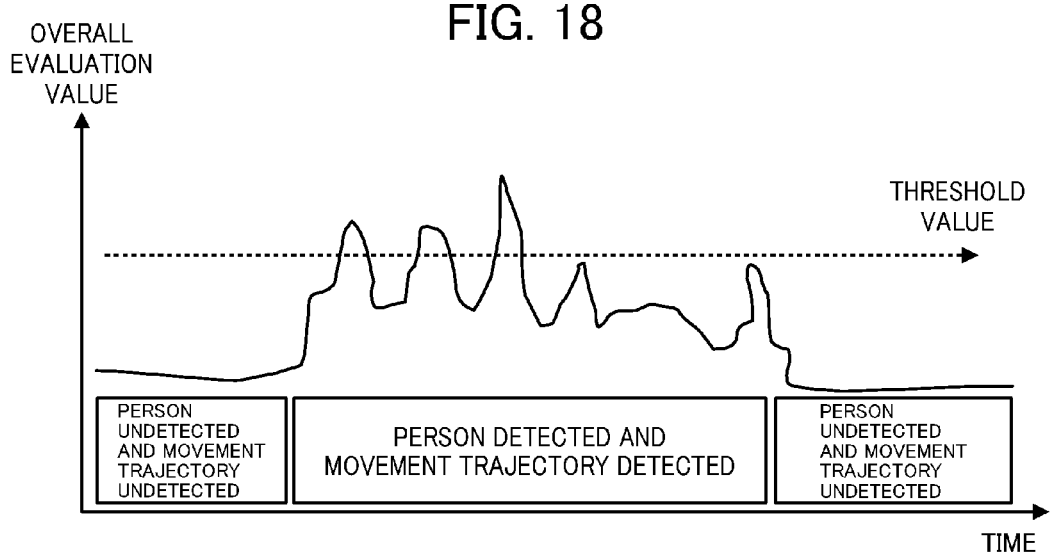
FIG. 18 is a graph of an example which represents an overall evaluation value of each of the still images of all of the frames extracted from the moving images.

Subsequently, from among the still image data of all of the frames extracted from the moving image data by the still image data extracting unit 39, as illustrated in FIG. 18, still image data of one or more still images where the overall evaluation value (a value obtained by adding each of the evaluation values or the like) of the evaluation value with respect to the motion of the person of interest, the evaluation value of the importance, the evaluation value of the composition, and the evaluation value of the image quality, is a threshold value or greater is output by the still image data output unit 46 as still image data of the still images corresponding to the best shot scenes (step S6).

Figure 19:
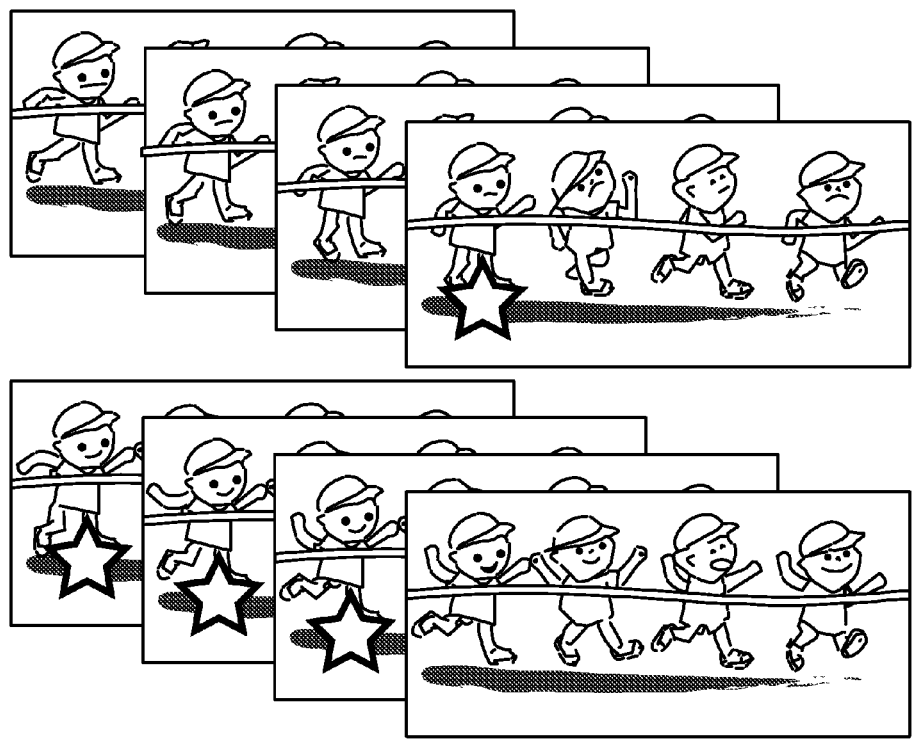
FIG. 19 is a conceptual diagram of an example which represents a state in which stars are assigned to still images for which the overall evaluation is equal to or greater than a threshold value from among the still images of all of the frames illustrated in FIG. 16.

FIG. 18 is a graph of an example representing the overall evaluation value of each of the still images of all of the frames extracted from the moving images. The vertical axis in FIG. 18 represents the overall evaluation value of each of the still images and the horizontal axis represents time (frames). As illustrated in FIG. 18, the person of interest is detected by the person of interest detecting unit 40 out of all of the still images, and the still image data of the still images for which the overall evaluation value is the threshold value or greater as illustrated in FIG. 19 with stars is output from among the still images for which the movement trajectory of the person of interest is detected by the movement trajectory detecting unit 41.

Finally, based on the orientation of the face of person of interest detected by the person of interest detecting unit 40, the top and bottom of the still images are corrected by the top and bottom correcting unit 47 so that the top and bottom of the still images are the same as the top and bottom of the filming device when the moving images were filmed (step S7).

As described above, the still image extracting unit 33, for example, can automatically detect the best shot scenes from among the moving images based on the overall evaluation value including the evaluation value with respect to the motion of the person of interest in the moving images, the evaluation value of the importance of the still images, the evaluation value of the composition, and the evaluation value of the image quality, and extract still image data of the still images corresponding to the best shot scenes from among the still image data of all of the frames extracted from the moving image data.

Next, description will be given of an operation for generating management image data in the content management system of the embodiment.

As described above, two or more frames of the still image data are output as the output still image data from among the plurality of frames of still image data extracted by the still image extracting unit 33 from the moving image data.

Subsequently, for each of the two or more pieces of output still image data extracted by the still image extracting unit 33, the scenes of the moving images including the output still images corresponding to the output still image data are determined by the scene determining unit 35.

Subsequently, each of the two or more pieces of output still image data, or the image feature amounts of each of the two or more output still images corresponding to the two or more pieces of output still image data, are registered in association with the moving image data of the scenes of the moving images corresponding to each of the two or more output still images as management markers by the management marker registration unit 25.

Then, management image data including at least two pieces of output still image data is generated by the management image generator 28.

Next, description will be given of an operation for playing back the scenes of the moving images by capturing the management image print in the content management system of the embodiment.

Captured image data is generated by capturing the management image print corresponding to the management image data using the imaging unit 11.

Subsequently, the management marker is read by the management marker reading unit 12 from the captured image corresponding to the captured image data.

Figure 20:
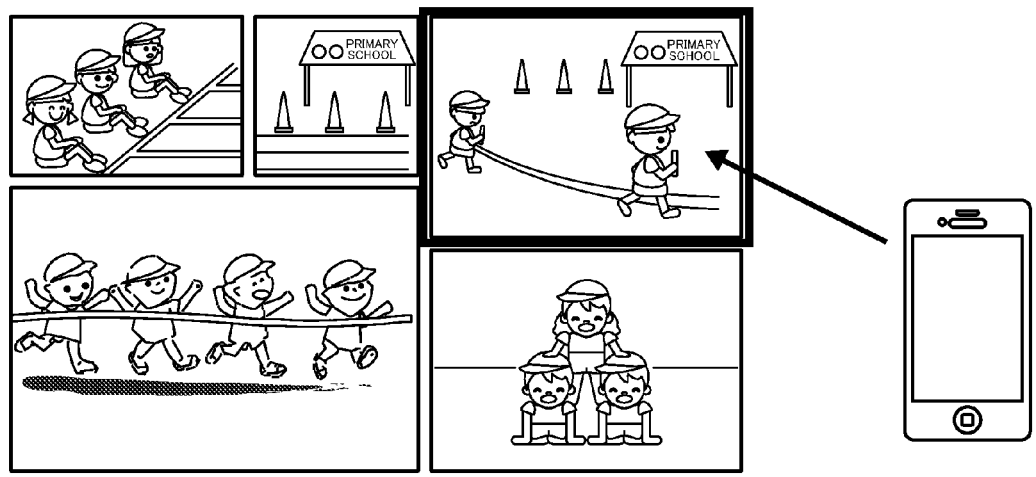
FIG. 20 is a conceptual diagram which represents a state in which one output still image is captured from among output still images included in a management image print.

For example, as illustrated in FIG. 20, in a case where one output still image at the top right is captured by the imaging unit 11 from among five output still images included in the management image print, the display controller 14 carries out control so as to play back the scene of the moving images corresponding to the moving image data associated with the management marker read by the management marker reading unit 12 from the one captured output still image, on the monitor 15. Because of this, the scenes of the moving images associated with the one captured output still image are played back on the monitor 15.

In addition, the same applies to the operation in a case where a different single output still image is captured by the imaging unit 11 from among the five output still images included in the management image print.

When the play back of the scenes of the moving images corresponding to the one captured output still image is finished, for example, the play back of the moving images is finished. In other words, the play back does not continue on to the scene of the moving images corresponding to the output still image at the filming time following the one captured output still image.

In this manner, in the content management system of the embodiment, each of the output still images included in the management image print is associated with scenes corresponding to each of the moving images. Therefore, the content management system of the embodiment can use the output still images included in the management image print as an index of the scenes corresponding to each of the moving images and play back desired scenes of the moving images by capturing the desired output still images included in the management image print.

It is desirable to control the size of the management image print according to the number of scenes included in the moving images.

For example, in the case of moving images lasting approximately one minute, there are one to several scenes in the moving images and the objective is achieved as long as the management image print including the several output still images can be printed. Therefore, a print of a large size is not necessary, for example, an L size print or the like is sufficient.

On the other hand, there may be ten to twenty scenes or more in a case where the play back time of the moving images is long. In such a case, when the output still images corresponding to all of the scenes are fitted into an L size management image print, the sizes of the output still images included in the management image print are reduced and it is difficult for the user to image the output still image which is the processing target using the information terminal 1. Therefore, for example, it is desirable to recommend a large print with a size greater than L.

Accordingly, the print controller 37 carries out control such that the size of the print on which the management images are printed is increased as the number of pieces of the output still image data included in the management image data is increased. In other words, the print controller 37 increases the size of the print on which the management images are printed such that the size of the output still images included in the management image print is a threshold value or greater according to the number of pieces of output still image data included in the management image data.

However, in a case where the user wants a management image print with a set size such as L size, it is similarly desirable to reduce the number of pieces of output still image data included in the management image data such that the size of the output still images included in the management image print is a threshold value or greater.

In this manner, in a case where it is assumed that the management images are printed on a print with a set size, when the size of the output still images included in the management image print is less than a threshold value, the management image generator 28 selects a number of pieces of output still image data where the size of the output still images included in the management image print with a set size is a threshold value or greater from among the output still image data and is able to generate management image data including the selected number of pieces of output still image data.

Figure 21:
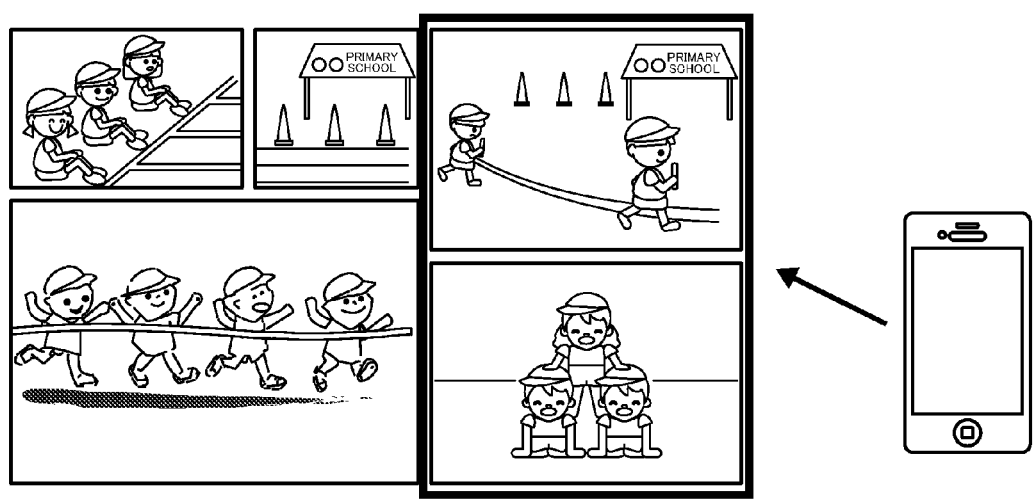
FIG. 21 is a conceptual diagram which represents a state in which two output still images are simultaneously captured from among the output still images included in the management image print.

In addition, for example, as illustrated in FIG. 21, in a case where two output still images on the right side are captured at the same time by the imaging unit 11 from among five output still images included in the management image print, the display controller 14 is able to carry out control such that the scenes of the moving images corresponding to each of the two output still images captured at the same time are played back at the same time on the monitor 15.

In addition, the same also applies to the operation in a case where three or more output still images are captured at the same time by the imaging unit 11 from among five output still images included in the management image print.

However, in a case where a plurality of scenes of the moving images are played back at the same time, because the play back times of each of the moving images are different, the finish times are also different.

In a case where the captured management image print is displayed on the monitor 15 using AR techniques and the scenes of the moving images are played back with AR in the display portion of the output still images of the management image print displayed on the monitor 15, it is not preferable to change the layout during the play back because the association with the display portion of the output still images of the management image print is important.

Therefore, during the AR play back, it is desirable for the display controller 14 to carry out control such that display is not performed at all in the display portion of the output still images for which the play back of the scenes of the moving image is finished.

In contrast, in a case where scenes of the moving images are played back normally over the entire surface of the monitor 15 or in a window with an optional size without using AR techniques, changing the layout of the display portion of the output still images of the management image print is preferable. Therefore, in the case of normal play back, it is desirable that the display controller 14 carries out control such that the display portion of the output still images for which the play back of the scenes of the moving images is finished is set to non-display and that the play back is carried out by enlarging the display portion of the output still images for which the play back of the scenes of the moving images is not finished up to the display portion of the output still images set to non-display.

In addition, the display controller 14 is able to carry out control such that, for example, an advertisement relevant to the scenes of the moving images for which the play back is finished is displayed in the display portion of the output still images for which the play back of the scenes of the moving image is finished for both the AR play back and the normal play back based on the video content of the scenes of the moving images. For example, in a case where the play back of the scenes of the moving image in which a child is filmed is finished, an advertisement for toys relevant to children is displayed in the display portion of the output still images.

In this manner, by displaying the advertisement in the display portion of the output still images for which the play back of the scenes of the moving images is finished, the advertisement is displayed while playing back the scenes of moving images for which the play back is not finished. The user will always see the advertisement displayed at the same time during the play back of the scenes of moving images for which the play back is not finished, thereby increasing the viewing rate for the advertisement in comparison with a case of only displaying the advertisement.

The image data (moving images or still images) for the advertisement can be stored in the data storage 26.

Alternatively, in a case of simultaneously playing back the scenes of moving images corresponding to each of two simultaneously captured output still images on the monitor 15, the display controller 14 can carry out control such that an advertisement or the scenes of optional moving images for which the importance is determined to be a threshold value or greater by the important scene determining unit 36 are played back in the output still image display portion in which scenes of the moving images for which the importance is determined to less than a threshold value by the important scene determining unit 36 are played back.

Next, description will be given of an operation for generating management image data using a plurality of pieces of moving image data.

In such a case, a still image data extracting unit, a person of interest detecting unit, a movement trajectory detecting unit, a motion analysis unit, a still image data output unit, and a scene determining unit 35 repeat the same processes as in a case of processing one set of moving image data as described above for each of a plurality of pieces of moving image data.

That is, one or two or more frames of the still image data are output from the still image extracting unit 33 as output still image data from among the plurality of frames of still image data extracted from the moving image data for each of the plurality of pieces of moving image data.

In addition, for each of one piece of output still image data or the two or more pieces of output still image data corresponding to each of the plurality of pieces of moving image data, the scenes of the moving images including the output still images corresponding to the output still image data are determined by the scene determining unit 35.

Subsequently, each of a plurality of pieces of first output still image data obtained by selecting at least one pieces of output still image data from among each of the output still image data corresponding to each of the plurality of pieces of moving image data, or an image feature amount of each of a plurality of first output still images corresponding to a plurality of pieces of first output still image data, are registered in association with the moving image data of the scenes of the moving images corresponding to each of the plurality of first output still images as first management markers by the management marker registration unit 25.

In addition, by setting the output still image data as second output still image data for each of the plurality of pieces of moving image data, each of one piece of second output still image data or two or more pieces of second output still image data, or the image feature amounts of the second output still images corresponding to each of the one piece of second output still image data or the two or more pieces of second output still image data, are registered in association with the moving image data of the scenes of the moving images corresponding to each of the one second output still image or the two or more second output still images as second management markers by the management marker registration unit 25.

Then, the management image generator 28 generates first management image data including at least two pieces of the first output still image data and second management image data including at least one piece of the second output still image data for each of the plurality of pieces of moving image data.

In a case of generating management image data using five pieces of moving image data, for example, first management image data including a total of five pieces of first output still image data is generated by selecting the output still image data from the output still image data corresponding to each of the five pieces of moving image data one at a time. In addition, the second management image data including at least one piece of second still image data is generated by setting the output still image data as second output still image data for each of the five pieces of moving image data.

Next, description will be given of an operation for playing back scenes of the moving images by capturing the print of the first management images corresponding to the first management image data generated using the plurality of pieces of moving image data.

The imaging unit 11 generates captured image data by capturing the print of the first management images corresponding to the first management image data.

Subsequently, the first management markers are read by the management marker reading unit 12 from the captured images corresponding to the captured image data.

For example, as illustrated on the upper side of FIG. 22, in a case where one first output still image on the lower left is captured by the imaging unit 11 from among five first output still images included in the print of the first management images, the display controller 14 carries out control such that the second management images corresponding to the moving image data associated with the first management marker read by the management marker reading unit 12 from the one captured first output still image are displayed on the monitor 15. Because of this, as illustrated on the lower side in FIG. 22, the second management images corresponding to the one captured first output still image are displayed on the monitor 15.

In addition, the same applies to the operation in a case where another first output still image is captured by the imaging unit 11 from among the five first output still images included in the print of the first management images.

Subsequently, the user inputs an instruction via an operation input unit 17 to select one second output still image on the lower right on the lower side in FIG. 22 from among the second output still images included in the second management image displayed on the monitor 15.

In a case where the one second output still image on the lower right on the lower side in FIG. 22 is selected from among six second output still images included in the second management images displayed on the monitor 15 according to the instruction inputted via the operation input unit 17, the display controller 14 carries out control so as to play back the scenes of the moving image corresponding to the moving image data associated with the second management marker read by the management marker reading unit 12 from the one selected second output still image, on the monitor 15. Because of this, the scenes of the moving images associated with the one selected second output still image are played back on the monitor 15.

In addition, the same applies to the operation in a case where another second output still image is selected from among the six second output still images included in the second management images according to the instruction inputted via the operation input unit 17.

For example, in a case of filming moving images of a child's sports day, because moving images are filmed for each event such as footraces or ball games, a plurality of moving images formed of moving images for each event are filmed as the moving images of the sports day. Because the content management system of the embodiment can gather a plurality of moving images in one first management image print, the user is able to instantly grasp a digest of the contents of the plurality of moving images filmed at the sports day or the like by glancing at the first management image print.

In a case of gathering a plurality of moving images in one first management image print, it is desirable that the management image generator 28 changes the display color of the first output still image according to the filming time of the first output still image corresponding to the first output still image data included in the first management image data. For example, the color is changed from sepia to a monotone color as the filming time changes from the latest time to the oldest time.

Because of this, the user is able to know the order of filming for the plurality of first output still images included in the first management image print, that is, the order of filming for the plurality of moving images.

In addition, in a case where there is a plurality of first output still images corresponding to the moving images, as the first output still images included in the first management images, for example, the first image among the plurality of first output still images corresponding to the moving images, that is, the image with the oldest filming time out of the plurality of first output still images, may be used. However, it is desirable to use the best image from among the plurality of first output still images corresponding to the moving images.

In such a case, the management marker registration unit 25 can obtain a plurality of the first output still image data by selecting the output still images for which the evaluation values are highest according to the image evaluating unit 34 one at a time from among the output still image data corresponding to each of the plurality of pieces of moving image data.

Because of this, the user can easily recall the moving images associated with the first output still images by looking at the first output still images included in the first management images.

In addition, it is desirable that the display controller 14 carries out control such that the display colors of the second output still images change according to the number of times of play back of the scenes of the moving images corresponding to the second output still images included in the second management images displayed on the monitor 15. For example, the second output still image corresponding to the scene of the moving images for which the number of times of play back is great is left as the original color and the second output still image corresponding to the scene of the moving images for which the number of times of play back is low is changed to a sepia color, a monotone color, or the like.

Because of this, by looking at the display colors of second output still images included in the second management images, the user is able to know the scenes of the moving images for which the number of times of play back is great, that is, scenes of moving images which the user likes.

In each of the embodiments described above, the display controller 14 may carry out AR play back of the scenes of the moving images, or normal play back when playing back scenes of the moving images on the monitor 15.

In addition, in each of the embodiments described above, it is not essential to generate the management image data including an access key; however, without being limited thereto, management image data including at least one output still image data and an access key may be generated and used when searching for the scene of the moving image associated with the output still image.

In addition, in the embodiments illustrated in FIG. 1 to FIG. 3, instead of the user selecting one frame of still image data using a still image selecting unit from among the still image data generated by a still image generator, a plurality of frames of still image data may be extracted from the moving image data by the still image extracting unit 33 and the still image data of one still image corresponding to the best shot scene may be automatically extracted from among the still image data of the plurality of extracted frames. In such a case, an access key may or may not be used.

In the device of the invention, each of the constituent components provided in the device may be configured by dedicated hardware, or each of the constituent components may be configured by a programmed computer.

The method of the invention can, for example, be realized through a program for causing a computer to execute each of the steps. In addition, the method of the invention can also be implemented via a computer-readable recording medium on which a program is recorded.

Above, detailed description was given of the content management system, the management content generating method, and the management content play back method of the invention; however, the invention is not limited to the embodiments described above and various modifications or changes may be made thereto in a range which does not depart from the gist of the invention.

What is claimed is:

1. A content management system that manages management content having a management image and moving image data associated with the management image, the content management system comprising:
   a still image data extracting unit that extracts a plurality of frames of still image data from moving image data;
   a person of interest detecting unit that detects a person of interest that is a person who is a processing target from each of a plurality of still images corresponding to the plurality of frames of still image data;
   a movement trajectory detecting unit that detects a movement trajectory of the person of interest by tracking movement of the person of interest in a moving image corresponding to the moving image data based on detection results of the person of interest in the plurality of still images;
   a motion analysis unit that analyzes that a motion of the person of interest in the moving image is a particular type of motion corresponding to a movement trajectory defined in advance by detecting a portion which is similar to the movement trajectory defined in advance from among the movement trajectory of the person of interest and calculates an evaluation value with respect to the motion of the person of interest based on a type of the analyzed motion of the person of interest for each of the plurality of still images;
   a still image data output unit that outputs, from among the plurality of frames of still image data, still image data of two or more still images each having the evaluation value with respect to the motion of the person of interest equal to or greater than a threshold value as output still image data;
   a scene determining unit that determines a scene of the moving image including an output still image corresponding to the output still image data for each of two or more pieces of the output still image data;
   a management marker registration unit that registers, as a management marker, each of the two or more pieces of output still image data or an image feature amount of each of two or more output still images corresponding to the two or more pieces of output still image data in association with moving image data of a scene of a moving image corresponding to each of the two or more output still images;
   a management image generator that generates management image data including at least two pieces of the output still image data;
   a storage that stores the moving image data;
   an access key issuing unit that issues an access key to limit a range of moving image data being retrieved based on the management marker, from among the moving image data stored in the storage;
   an imaging unit that generates captured image data by capturing a management image print corresponding to the management image data;
   a management marker reading unit that reads the management marker from a captured image corresponding to the captured image data;
   a monitor on which the moving image is played back; and
   a display controller that controls play back of the moving image on the monitor,
   wherein, when two or more output still images are simultaneously captured by the imaging unit from among output still images included in the management image print, the display controller carries out control so as to simultaneously play back, on the monitor, scenes of moving images respectively corresponding to moving image data associated with the management marker read by the management marker reading unit from the two or more output still images simultaneously captured, wherein the management image generator generates the management image data including the output still image data and the access key.

2. The content management system according to claim 1, wherein, when a degree of change in color between two adjacent output still images arranged in order of filming time in the moving images exceeds a threshold value, the scene determining unit divides the scene of the moving images at a point between the two adjacent output still images in which the degree of change in color exceeds the threshold value and determines a scene of the moving image including the output still image from among scenes of the divided moving images.

3. The content management system according to claim 1, further comprising:
an operation input unit that receives an access key contained in the management image print and inputted by a user; and
an image data retrieval unit that limits the range of moving image data retrieved based on the management marker from among the moving image data stored in the storage based on the access key inputted via the operation input unit, and retrieves moving image data corresponding to the management image print from among the limited range of moving image data based on the management marker,
wherein the display controller carries out control to play back, on the monitor, the scenes of the moving images corresponding to the moving image data associated with the management marker read by the management marker reading unit from one output still images captured, from among the moving image data retrieved by the image data retrieval unit.

4. The content management system according to claim 1, wherein the still image data extracting unit, the person of interest detecting unit, the movement trajectory detecting unit, the motion analysis unit, the still image data output unit, and the scene determining unit repeatedly perform processes on each of a plurality of pieces of the moving image data,
wherein the management marker registration unit registers, as a first management marker, each of a plurality of pieces of first output still image data obtained by selecting at least one piece of the output still image data from among each of the output still image data corresponding to each of the plurality of pieces of moving image data, or an image feature amount of each of a plurality of first output still images corresponding to the plurality of pieces of first output still image data, in association with moving image data of a scene of a moving image corresponding to each of the plurality of first output still images, and, by setting the output still image data as second output still image data for each of the plurality of pieces of moving image data, registers, as a second management marker, one piece of the second output still image data or each of two or more pieces of the second output still image data, or an image feature amount of a second output still image corresponding to the one piece of second output still image data or each of the two or more pieces of second output still image data, in association with moving image data of a scene of a moving image corresponding to one piece of the second output still image or each of two or more pieces of the second output still images, and
wherein the management image generator generates first management image data including at least two pieces of the first output still image data and second management image data including at least one piece of the second output still image data for each of the plurality of pieces of moving image data.

5. The content management system according to claim 4, wherein the imaging unit generates captured image data by capturing a print of a first management image corresponding to the first management image data,
the management marker reading unit reads the first management marker from the captured image corresponding to the captured image data,
the content management system further comprises an operation input unit that receives an instruction inputted by a user,
wherein, when one first output still image is captured by the imaging unit from among first output still images included in the print of the first management image, the display controller carries out control so that a second management image corresponding to the moving image data associated with the first management marker read by the management marker reading unit from the one first output still image captured is displayed on the monitor, and
wherein, when one second output still image is selected from among second output still images included in the second management image displayed on the monitor according to an instruction inputted via the operation input unit, the display controller carries out control so that a scene of a moving image corresponding to moving image data associated with a second management marker read by the management marker reading unit from the one second output still image selected is played back on the monitor.

6. The content management system according to claim 5, wherein the operation input unit receives the access key contained in the print of the first management image and inputted by the user, and
wherein the content management system further comprises:
an image data retrieval unit that limits the range of moving image data retrieved based on the management marker from among the moving image data stored in the storage based on the access key inputted via the operation input unit, and retrieves moving image data corresponding to the management image print from among the limited range of moving image data based on the management marker,
wherein the display controller carries out control so that the second management image corresponding to the moving image data associated with the first management marker read by the management marker reading unit from the one first output still image captured, from among the moving image data retrieved by the image data retrieval unit, is displayed on the monitor.

7. A management content play back method, comprising:
playing back management content generated by a management content generating method that generates management content having a management image and moving image data associated with the management image, the management content generating method comprising:
extracting a plurality of frames of still image data from moving image data with a still image data extracting unit;
detecting a person of interest that is a person who is a processing target from each of a plurality of still images corresponding to the plurality of frames of still image data with a person of interest detecting unit;

detecting a movement trajectory of the person of interest by tracking movement of the person of interest in a moving image corresponding to the moving image data based on detection results of the person of interest in the plurality of still images with a movement trajectory detecting unit;

analyzing that a motion of the person of interest in the moving image is a particular type of motion corresponding to a movement trajectory defined in advance by detecting a portion which is similar to the movement trajectory defined in advance from among the movement trajectory of the person of interest and calculating an evaluation value with respect to the motion of the person of interest based on a type of the analyzed motion of the person of interest for each of the plurality of still images with a motion analysis unit;

outputting, from among the plurality of frames of still image data, still image data of two or more still images each having the evaluation value with respect to the motion of the person of interest equal to or greater than a threshold value as output still image data with a still image data output unit;

determining a scene of the moving image including an output still image corresponding to the output still image data for each of two or more pieces of the output still image data with a scene determining unit;

registering, as a management marker, each of the two or more pieces of output still image data or an image feature amount of each of two or more output still images corresponding to the two or more pieces of output still image data in association with moving image data of a scene of a moving image corresponding to each of the two or more output still images with a management marker registration unit;

generating management image data including at least two pieces of the output still image data with a management image generator;

issuing an access key to limit a range of moving image data being retrieved based on the management marker, from among the moving image data stored in a storage with an access key issuing unit;

generating captured image data by capturing a management image print corresponding to the management image data with an imaging unit;

reading the management marker from a captured image corresponding to the captured image data with a management marker reading unit; and carrying out control with a display controller when two or more output still images are simultaneously captured by the imaging unit from among the output still images included in the management image print, to simultaneously play back, on the monitor, scenes of moving images respectively corresponding to moving image data associated with the management marker read by the management marker reading unit from the two or more output still images simultaneously captured, wherein the management image data is generated including the output still image data and the access key.

* * * * *